(12) United States Patent
Pezeshki et al.

(10) Patent No.: US 12,389,244 B2
(45) Date of Patent: Aug. 12, 2025

(54) TECHNIQUES FOR BEAM FAILURE DETECTION REFERENCE SIGNALS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 17/570,034

(22) Filed: Jan. 6, 2022

(65) Prior Publication Data

US 2022/0225134 A1 Jul. 14, 2022

Related U.S. Application Data

(60) Provisional application No. 63/137,632, filed on Jan. 14, 2021.

(51) Int. Cl.
*H04W 24/08* (2009.01)
*H04B 7/06* (2006.01)

(52) U.S. Cl.
CPC ........... *H04W 24/08* (2013.01); *H04B 7/0695* (2013.01)

(58) Field of Classification Search
CPC ............................. H04W 24/08; H04B 7/0695
USPC .......................................................... 370/216
See application file for complete search history.

(56) References Cited

U.S. PATENT DOCUMENTS

| | | | |
|---|---|---|---|
| 2019/0215048 A1* | 7/2019 | Cirik | H04W 76/19 |
| 2020/0007678 A1* | 1/2020 | Zhou | H04B 7/088 |
| 2022/0046438 A1* | 2/2022 | Lo | H04B 7/0695 |
| 2022/0061087 A1* | 2/2022 | Koskela | H04W 16/28 |

* cited by examiner

*Primary Examiner* — Chae S Lee
(74) *Attorney, Agent, or Firm* — Holland & Hart LLP

(57) ABSTRACT

Methods, systems, and devices for wireless communications are described. A user equipment (UE) may communicate with multiple transmission reception points (TRPs). The UE may receive control signaling indicating a reference signal configuration. The reference signal configuration, the control signaling, or both may indicate one or more beam failure detection (BFD) reference signals and a quasi co-location (QCL) type associated with a set of BFD reference signal sets. Each BFD reference signal set of the set of BFD reference signal sets may be associated with a respective TRP. The UE may detect a beam failure based on receiving a BFD reference signal set using one or more beams according to the QCL type associated with the BFD reference signal set. The UE may initiate a beam failure recovery procedure based on detecting the beam failure.

26 Claims, 15 Drawing Sheets

TECHNIQUES FOR BEAM FAILURE DETECTION REFERENCE SIGNALS

CROSS REFERENCE

The present application for patent claims the benefit of U.S. Provisional Patent Application No. 63/137,632 by PEZESHKI et al., entitled "TECHNIQUES FOR BEAM FAILURE DETECTION REFERENCE SIGNALS," filed Jan. 14, 2021, assigned to the assignee hereof, and expressly incorporated by reference herein.

FIELD OF TECHNOLOGY

The following relates to wireless communications, including techniques for beam failure detection reference signals (BFD-RS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support beamformed communications with multiple transmission-reception points (TRPs). However, such systems may experience beam failures, which may reduce the efficiency of the systems and increase signaling overhead.

SUMMARY

The described techniques relate to improved methods, systems, devices, and apparatuses that support techniques for beam failure detection reference signals (BFD-RS). Generally, the described techniques provide for a configuration of BFD-RSs and corresponding quasi co-location (QCL) parameters, which may support devices (e.g., user equipment (UE), transmission reception points (TRPs)) to detect beam failures, adjust one or more parameters of one or more beams, or both, based on the BFD-RS and QCL parameters. For example, the described techniques may include options for QCL types for BFD-RS in the context of multiple TRP beam failure detection. As an illustrative example, a UE may receive control signaling indicating a reference signal configuration from a TRP of a set of TRPs (e.g., the UE may be in communication with multiple TRPs). The reference signal configuration may indicate one or more BFD-RS, a QCL type associated with a set of BFD-RS sets, or a combination thereof. The reference signal configuration may configure the UE with a BFD-RS set for each TRP.

The UE may determine the QCL type for one or more reference signals based on the reference signal configuration or other control signaling. For example, the reference signal configuration (or other control signaling) may configure the UE with a QCL type for one or more reference signals as described herein. The UE may determine the QCL type for the one or more reference signals based on a pre-configuration of the UE and receive one or more BFD-RS according to the reference signal configuration and a respective QCL type. The UE may detect a beam failure based on receiving the reference signals and initiate a beam recovery procedure. The beam failure report may indicate the detected beam failure. Accordingly, the techniques described herein may enable the UE or a TRP to detect beam failures and adjust one or more beams or parameters based on the detected beam failures, which may result in improved communications.

A method for wireless communications at a UE is described. The method may include receiving control signaling indicating a reference signal configuration indicating one or more BFD-RSs and a QCL type associated with a set of multiple BFD-RS sets, where each BFD-RS set of the set of multiple BFD-RS sets is associated with a TRP of a set of multiple TRPs in communication with the UE, detecting a beam failure based on receiving a BFD-RS set using one or more beams according to the QCL type associated with the BFD-RS set, and initiating a beam failure recovery procedure based on the detected beam failure.

An apparatus for wireless communications at a UE is described. The apparatus may include a processor, memory in electronic communication with the processor, and instructions stored in the memory. The instructions may be executable by the processor to cause the apparatus to receive control signaling indicating a reference signal configuration indicating one or more BFD-RSs and a QCL type associated with a set of multiple BFD-RS sets, where each BFD-RS set of the set of multiple BFD-RS sets is associated with a TRP of a set of multiple TRPs in communication with the UE, detect a beam failure based on receiving a BFD-RS set using one or more beams according to the QCL type associated with the BFD-RS set, and initiate a beam failure recovery procedure based on the detected beam failure.

Another apparatus for wireless communications at a UE is described. The apparatus may include means for receiving control signaling indicating a reference signal configuration indicating one or more BFD-RSs and a QCL type associated with a set of multiple BFD-RS sets, where each BFD-RS set of the set of multiple BFD-RS sets is associated with a TRP of a set of multiple TRPs in communication with the UE, means for detecting a beam failure based on receiving a BFD-RS set using one or more beams according to the QCL type associated with the BFD-RS set, and means for initiating a beam failure recovery procedure based on the detected beam failure.

A non-transitory computer-readable medium storing code for wireless communications at a UE is described. The code may include instructions executable by a processor to receive control signaling indicating a reference signal configuration indicating one or more BFD-RSs and a QCL type associated with a set of multiple BFD-RS sets, where each BFD-RS set of the set of multiple BFD-RS sets is associated with a TRP of a set of multiple TRPs in communication with the UE, detect a beam failure based on receiving a BFD-RS set using one or more beams according to the QCL type associated with the BFD-RS set, and initiate a beam failure recovery procedure based on the detected beam failure.

In some examples of the method, apparatuses, and non-transitory computer-readable medium described herein, the QCL type associated with the set of multiple BFD-RS sets includes a QCL type corresponding to a spatial filter parameter applicable to a first frequency range and inapplicable to a second frequency range different from the first frequency range.

Some examples of the method, apparatuses, and non-transitory computer-readable medium described herein may further include operations, features, means, or instructions for receiving, in a message, a transmission configuration indicator state including an indication of the QCL type associated with the set of multiple BFD-RS sets and where the QCL type associated with the set of multiple BFD-RS sets includes a QCL type corresponding to a Doppler shift, a Doppler spread, an average delay, a delay spread, or any combination thereof.

In some examples of the method, apparatuses, and non-transitory computer-readable medium described herein, the message includes a downlink control information message.

In some examples of the method, apparatuses, and non-transitory computer-readable medium described herein, the message includes a medium access control-control element message.

In some examples of the method, apparatuses, and non-transitory computer-readable medium described herein, the reference signal configuration includes the transmission configuration indicator state.

Some examples of the method, apparatuses, and non-transitory computer-readable medium described herein may further include operations, features, means, or instructions for determining that the QCL type associated with the set of multiple BFD-RS sets includes a QCL type corresponding to a Doppler shift, a Doppler spread, an average delay, a delay spread, or any combination thereof, based on an absence of the QCL type associated with the set of multiple BFD-RS sets including a QCL type corresponding to a spatial filter parameter.

Some examples of the method, apparatuses, and non-transitory computer-readable medium described herein may further include operations, features, means, or instructions for detecting the beam failure based on receiving the BFD-RS set of the set of multiple BFD-RS sets using the one or more beams according to the QCL type associated with the set of multiple BFD-RS sets including the QCL type corresponding to a Doppler shift, a Doppler spread, an average delay, a delay spread, or any combination thereof.

In some examples of the method, apparatuses, and non-transitory computer-readable medium described herein, receiving control signaling may include operations, features, means, or instructions for receiving the control signaling indicating the reference signal configuration from the first TRP and a BFD-RS set corresponding to the first TRP.

Some examples of the method, apparatuses, and non-transitory computer-readable medium described herein may further include operations, features, means, or instructions for receiving second control signaling indicating a second reference signal configuration from a second TRP, where the detected beam failure corresponds to the first TRP, the second TRP, or a combination thereof.

A method for wireless communications at a TRP is described. The method may include transmitting, to a UE, control signaling indicating a reference signal configuration indicating one or more BFD-RSs and a QCL type associated with a set of multiple BFD-RS sets, where a BFD-RS set of the set of multiple BFD-RS sets is associated with the TRP and transmitting a BFD-RS set using one or more beams according to the QCL type associated with the BFD-RS set.

An apparatus for wireless communications at a TRP is described. The apparatus may include a processor, memory in electronic communication with the processor, and instructions stored in the memory. The instructions may be executable by the processor to cause the apparatus to transmit, to a UE, control signaling indicating a reference signal configuration indicating one or more BFD-RSs and a QCL type associated with a set of multiple BFD-RS sets, where a BFD-RS set of the set of multiple BFD-RS sets is associated with the TRP and transmit a BFD-RS set using one or more beams according to the QCL type associated with the BFD-RS set.

Another apparatus for wireless communications at a TRP is described. The apparatus may include means for transmitting, to a UE, control signaling indicating a reference signal configuration indicating one or more BFD-RSs and a QCL type associated with a set of multiple BFD-RS sets, where a BFD-RS set of the set of multiple BFD-RS sets is associated with the TRP and means for transmitting a BFD-RS set using one or more beams according to the QCL type associated with the BFD-RS set.

A non-transitory computer-readable medium storing code for wireless communications at a TRP is described. The code may include instructions executable by a processor to transmit, to a UE, control signaling indicating a reference signal configuration indicating one or more BFD-RSs and a QCL type associated with a set of multiple BFD-RS sets, where a BFD-RS set of the set of multiple BFD-RS sets is associated with the TRP and transmit a BFD-RS set using one or more beams according to the QCL type associated with the BFD-RS set.

In some examples of the method, apparatuses, and non-transitory computer-readable medium described herein, the QCL type associated with the set of multiple BFD-RS sets includes a QCL type corresponding to a spatial filter parameter applicable to a first frequency range and inapplicable to a second frequency range different from the first frequency range.

Some examples of the method, apparatuses, and non-transitory computer-readable medium described herein may further include operations, features, means, or instructions for transmitting, in a message, a transmission configuration indicator state including an indication of the QCL type associated with the set of multiple BFD-RS sets and where the QCL type associated with the set of multiple BFD-RS sets includes a QCL type corresponding to a Doppler shift, a Doppler spread, an average delay, a delay spread, or any combination thereof.

In some examples of the method, apparatuses, and non-transitory computer-readable medium described herein, the message includes a downlink control information message. In some examples of the method, apparatuses, and non-transitory computer-readable medium described herein, the message includes a medium access control-control element message. In some examples of the method, apparatuses, and non-transitory computer-readable medium described herein, the reference signal configuration includes the transmission configuration indicator state.

Some examples of the method, apparatuses, and non-transitory computer-readable medium described herein may further include operations, features, means, or instructions for receiving a beam failure report based on transmitting the BFD-RS set.

Some examples of the method, apparatuses, and non-transitory computer-readable medium described herein may further include operations, features, means, or instructions for determining that the QCL type associated with the set of multiple BFD-RS sets includes a QCL type corresponding to a Doppler shift, a Doppler spread, an average delay, a delay spread, or any combination thereof, based on an absence of the QCL type associated with the set of multiple BFD-RS sets including a QCL type corresponding to a spatial filter parameter.

Some examples of the method, apparatuses, and non-transitory computer-readable medium described herein may further include operations, features, means, or instructions for transmitting one or more BFD-RSs associated with a BFD-RS set of the set of multiple BFD-RS sets using the one or more beams according to the QCL type associated with the BFD-RS set including the QCL type corresponding to a Doppler shift, a Doppler spread, an average delay, a delay spread, or any combination thereof.

DETAILED DESCRIPTION

Figure 1:
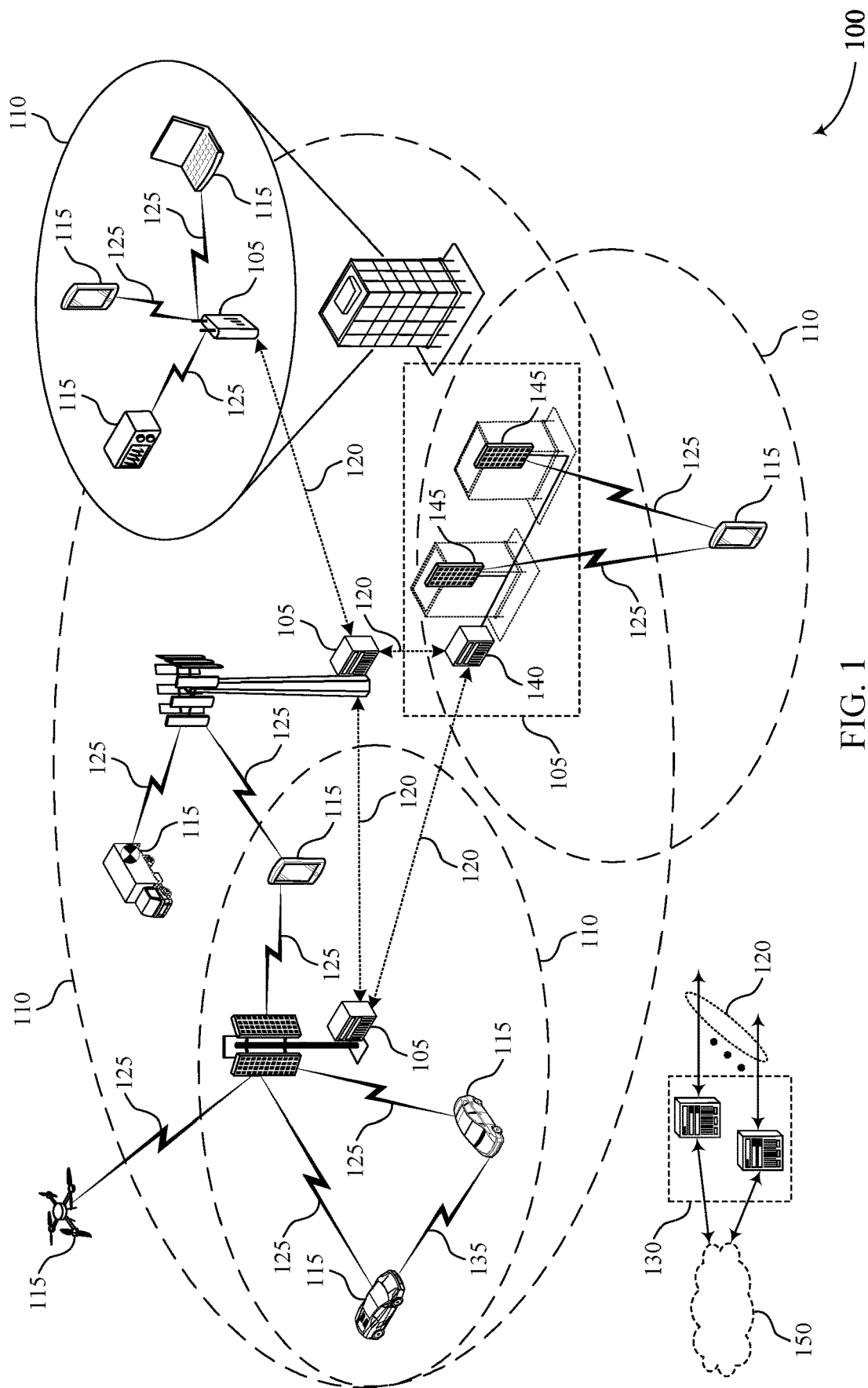
FIGS. 1 and 2 illustrate examples of wireless communications systems that support techniques for beam failure detection reference signals (BFD-RS) in accordance with aspects of the present disclosure.

A wireless communications system may include various communication devices such as a user equipment (UE) and a base station, where the base station may provide wireless communication services to the UE. For example, the base station may be a next-generation NodeB (referred to as a gNB) that may support multiple radio access technologies including fourth generation (4G) systems, such as 4G Long Term Evolution (LTE), as well as fifth generation (5G) systems, which may be referred to as 5G New Radio (NR). In some wireless communications systems, a UE may communicate with multiple transmission-reception points (TRPs). A TRP may be an access point, a base station, or another UE.

The UE may receive a coordinated transmission of downlink data from multiple TRPs. In some cases, such multi-TRP communications may use a time division multiplexing (TDM) communication scheme, a frequency division multiplexing (FDM) communication scheme, a space division multiplexing (SDM) communication scheme, or a single-frequency network (SFN) communication scheme to support the UE to receive data from the multiple TRPs. A UE receiving downlink data via coordinated transmissions from multiple TRPs may experience greater macro or space diversity gain or greater frequency diversity gain according to a multi-TRP communication scheme, which may increase a likelihood of the UE to successfully receive and decode the downlink data.

However, in some cases, a UE may experience one or more beam failures. For example, one or more TRPs may each use one or more beams to transmit information to a UE. Such communications may experience signal attenuation (e.g., path loss, penetration loss, blockage loss), which may be influenced by various factors, such as diffraction, propagation environment, density of blockages, material properties, etc. In some cases, channel conditions for the communications may fail to satisfy a threshold due to such signal attenuation. For example, a blockage or other factors may degrade channel conditions and result in a beam failure. In such examples, the UE may be unable to successfully receive or decode communications associated with the beam, which may reduce communication quality, increase latency, and result in a relatively poor user experience.

Various aspects of the present disclosure relate to techniques for improved beam failure detection reference signals (BFD-RS). For example, the described techniques may provide for the configuration of BFD-RS, quasi co-location (QCL) parameters (e.g., QCL types), or a combination thereof, which may support the UE or other devices (e.g., TRPs) to detect beam failures with relatively high accuracy or speed, among other benefits. The techniques, for example, describe options for QCL types for BFD-RS, in the context of multiple TRP beam failure detection. For example, a UE may receive control signaling indicating a reference signal configuration from a TRP of a set of TRPs (e.g., the UE may be in communication with multiple TRPs). The reference signal configuration may indicate one or more BFD-RS, a QCL type associated with a set of BFD-RS sets, or a combination thereof.

The reference signal configuration may configure the UE with a BFD-RS set for each TRP (e.g., one or more TRPs may configure the UE with multiple sets of BFD-RS where each set of BFD-RS corresponds to a respective TRP). The UE may determine the QCL type or other QCL parameters for one or more reference signals based on the reference signal configuration or other control signaling. For example, the reference signal configuration may configure the UE with a QCL type for one or more reference signals (e.g., a QCL type for multiple sets of reference signals, a QCL types for a set of reference signals associated with a respective TRP, a QCL type for each reference signal, or any combination thereof). In some examples, the UE may determine the QCL type or other QCL parameters for the one or more reference signals based on a pre-configuration of the UE.

As an illustrative example, a UE may determine that one or more BFD-RS correspond to a QCL type associated with a spatial filter parameter, which may be referred to as a QCL type D. In some such cases, beam failure detection may be applied to a frequency range (e.g., a frequency range 2 (FR2) corresponding to deployments in 24-52.6 gigahertz (GHz) ranges, such as 24 GHz, 26 GHz, 28 GHz, 39 GHz, etc.). For example, the UE may detect or otherwise monitor for beam failures for communications in the first frequency range based on receiving the BFD-RS using the spatial filter parameter. In some examples, beam failure detection may be inapplicable to another frequency range (e.g., a frequency range 1 (FR1) corresponding to deployments in 410 megahertz (MHz)-7.125 GHz ranges) based on the QCL type for the BFD-RS being a QCL type D (e.g., the QCL spatial filter parameter may not be used for the other frequency range).

Additionally or alternatively, the UE may determine that one or more BFD-RS correspond to other QCL types, such as a QCL type associated with a Doppler shift, a Doppler spread, an average delay, a delay spread, or any combination thereof, among other examples of QCL parameters. Such QCL types may be examples of a QCL type A (e.g., a QCL type associated with a Doppler shift, a Doppler spread, an average delay, and a delay spread), a QCL type B (e.g., a QCL type associated with a Doppler shift and a Doppler spread), a QCL type C (e.g., a QCL type associated with a Doppler shift and an average delay), or any combination thereof, among other examples of QCL types (e.g., a QCL type associated with a delay spread, an average delay, or other QCL parameters).

The UE may determine that the one or more BFD-RS correspond to other QCL types based on an absence of a QCL type D. For example, if a QCL type D reference signal is unavailable (e.g., due to communications being in a frequency range that does not support a QCL type with a spatial filter parameter), the UE may identify a QCL type for a set of reference signals based on an indication in a transmission configuration indicator (TCI) state (e.g., the TRP may send a TCI state as part of a configuration message and the TCI state may indicate a QCL type for a respective set of BFD-RS). In some examples, the UE may receive one or more reference signals according to the reference signal configuration and a QCL type. The UE may detect a beam failure based on receiving the reference signals and initiate a beam recovery procedure. For example, the UE may transmit a beam failure report to one or more TRPs. The beam failure report may indicate the detected beam failure.

Aspects of the techniques described herein may be implemented to realize one or more of the following potential advantages or improvements, among others. The techniques described herein may provide benefits and enhancements to the operation of a UE or a TRP, or both. For example, operations performed by the UE or the TRP, or both, may provide improvements to beamformed communications to multiple TRPs by enabling the UE or a TRP to detect beam failures and adjust one or more beams or parameters based on the detected beam failures, which may result in improved beamformed communications, among other advantages.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for BFD-RS.

FIG. 1 illustrates an example of a wireless communications system 100 that supports techniques for BFD-RS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 and a base station 105 may communicate over a communication link 125 and, in some cases, the UE 115 may perform one or more channel measurements of the communication link 125 between the UE 115 and the base station 105 to determine a channel quality associated with the communication link 125. In some examples, the base station 105 may configure a set of channel measurement resources, such as CSI-RS resources, and the UE 115 may perform the one or more channel measurements over one or more of the configured set of channel measurement resources to determine the channel quality associated with the communication link 125. For example, the base station 105 may transmit one or more downlink reference signals, such as BFD-RSs (e.g., CSI-RSs), over one or more channel measurement resources and the UE 115 may measure the one or more downlink reference signals to determine the channel quality associated with the communication link 125. The UE 115 may generate a report (e.g., a beam failure report, a channel state information (CSI) report, or a combination thereof) based on the measured channel quality. In some cases, the UE 115 may communicate with multiple TRPs (which may be examples of base stations 105 or relay nodes associated with base stations, among other examples of TRPs) and may measure a channel quality associated with each communication link between the UE 115 and the multiple TRPs.

The UE 115 may receive coordinated transmissions of downlink data from multiple TRPs in a multi-TRP communications system and the UE 115 may monitor resources to detect potential beam failures for communication links between the UE 115 and the multiple TRPs from which the UE 115 may receive downlink data. For example, the UE 115 may receive one or more downlink reference signals such as BFD-RSs (e.g., CSI-RSs, tracking reference signals (TRSs), or other reference signals implemented for beam failure detection) over one or more configured channel measurement resources from one or more of the multiple TRPs. In some examples, the UE 115 may receive the reference signals in accordance with a QCL type. For example, the UE may receive control signaling indicating a reference signal configuration for one or more of the multiple TRPs.

The reference signal configuration may indicate one or more sets of BFD-RSs, a QCL type associated with a respective set of BFD-RSs, or a combination thereof. For example, the reference signal configuration may configure the UE 115 with a BFD-RS set for each TRP. In some examples, the UE 115 may determine the QCL type for one or more reference signals based on the reference signal configuration or other control signaling. For example, the reference signal configuration (or other control signaling) may configure the UE 115 with a QCL type for one or more reference signals (e.g., a QCL type for multiple sets of reference signals, a QCL types for a set of reference signals associated with a respective TRP, a QCL type for each reference signal, or any combination thereof). In some examples, the UE 115 may determine the QCL type for the one or more reference signals based on a pre-configuration of the UE 115.

The UE 115 may compare one or more metrics (e.g., reference signal received power (RSRP) or other channel metrics) of the received BFD-RSs to a threshold. The UE 115 may determine that the metrics fail to satisfy a threshold. The UE 115 may detect a beam failure for the beam associated with the set of BFD-RSs based on the metrics failing to satisfy the threshold. The UE 115 may report such beam failures to the one or more TRPs. The TRPs may adjust the failed beams or switch to other beams for subsequent communications, which may improve communication reliability and efficiency, among other advantages.

Figure 2:
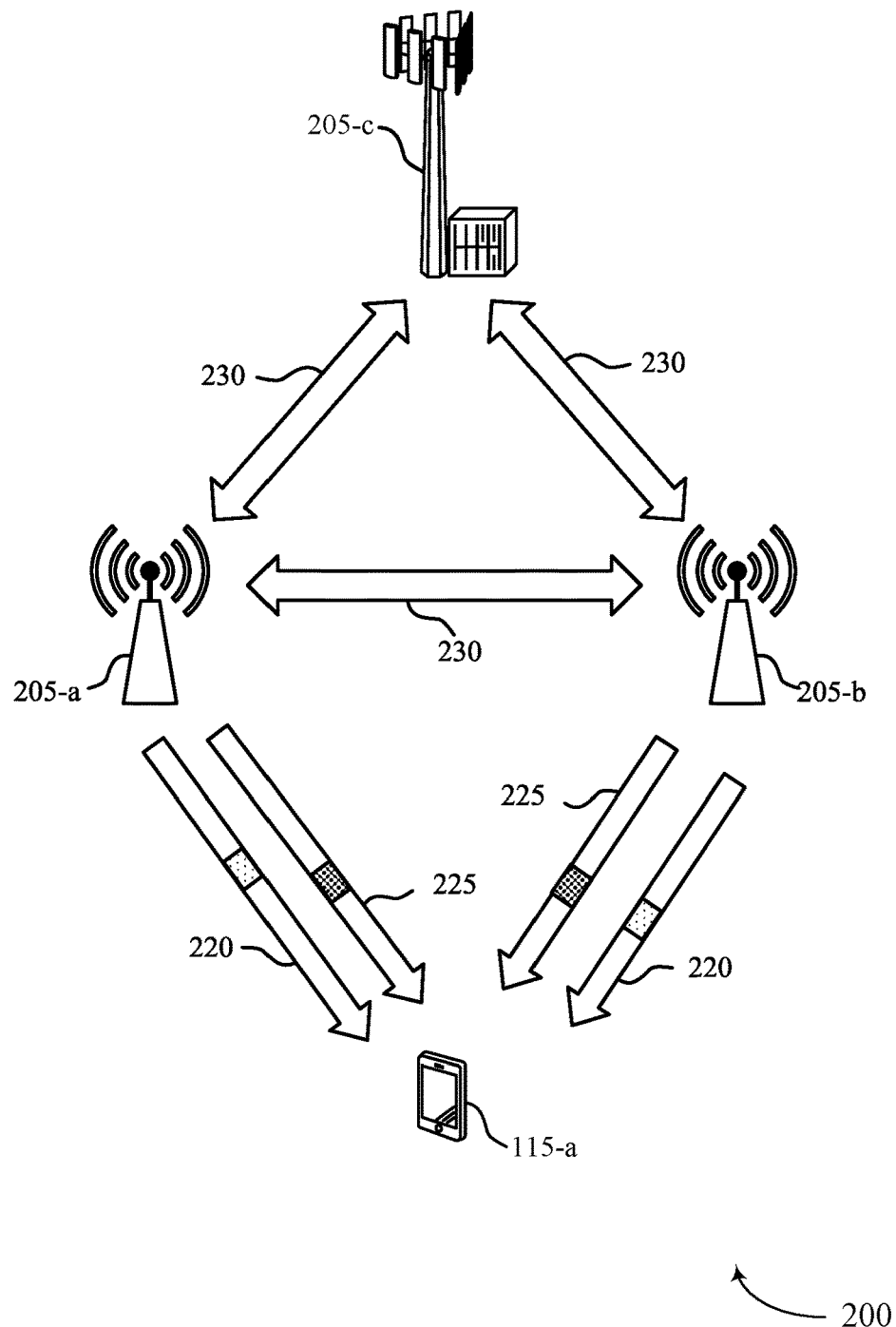

FIG. 2 illustrates an example of a wireless communications system 200 that supports techniques for BFD-RS in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a TRP 205-a, a TRP 205-b, and a TRP 205-c, which may be examples of corresponding devices described herein. The wireless communications system 200 may support configuration of BFD-RS or QCL types, or both.

The TRPs 205 may be examples of the various devices described herein, such as a base station 105, relay nodes associated with the base station 105, or any combination thereof (e.g., the TRP 205-c may be an example of a base station 105 and the TRPs 205-a and 205-b may be examples of relay nodes). Although shown as the UE 115-a communicating with the TRP 205-a and the TRP 205-b for illustrative clarity, it is to be understood that any quantity of TRPs 205 may be included in the wireless communications system 200 and in communication with the UE 115-a. In some examples, the TRPs 205 may communicate via communication links 230. For example, the TRP 205-c may function as or be connected to a core network entity and may exchange signaling with the TRP 205-a and the TRP 205-b via communication links 230.

The UE 115-a may communicate with multiple TRPs 205. For example, the UE 115-a may receive a coordinated transmission of downlink data from multiple TRPs 205 (e.g., the TRP 205-a and the TRP 205-b may send downlink data in a coordinated manner to the UE 115-a). In some cases, such multi-TRP communications may use a TDM communication scheme, an FDM communication scheme, an SDM communication scheme, or an SFN communication scheme to support the UE 115-a to receive data from the multiple TRPs 205. The UE 115-a may experience greater macro or space diversity gain or greater frequency diversity gain based on receiving the downlink data according to a multi-TRP communication scheme, which may increase a likelihood of the UE 115-a to successfully receive and decode the downlink data.

In examples in which the TRP 205-a and the TRP 205-b apply a TDM communication scheme, the TRP 205-a and the TRP 205-b may perform coordinated transmissions over different time resources but overlapping frequency resources (such as over different sets of OFDM symbols but over a same set of REs) based on transmitting different sets of time-domain resources (e.g., OFDM symbols, slots, or mini-slots) with different TCI states. In examples in which the TRP 205-a and the TRP 205-b apply an FDM communication scheme, the TRP 205-a and the TRP 205-b may perform coordinated transmissions over different frequency resources but overlapping time resources (such as over different sets of REs but over a same set of OFDM symbols) based on transmitting different sets of frequency-domain resources (e.g., REs) with different TCI states. Further, in examples in which the TRP 205-a and the TRP 205-b apply an SDM communication scheme, the TRP 205-a and the TRP 205-b may perform coordinated transmissions over a same resource (such as over a same set of REs and OFDM symbols) based on transmitting different layers (e.g., spatial layers) with different TCI states. In examples in which the TRP 205-a and the TRP 205-b apply an SFN communication scheme, the TRP 205-a and the TRP 205-b may transmit a same signal simultaneously. In other words, according to an SFN communication scheme, a same signal may be transmitted simultaneously from multiple, spatially dispersed TRPs 205.

The UE 115-a may communicate with the TRPs 205 via beamformed communications using one or more beams as described herein. For example, the UE 115-a may receive a downlink signal 225 via one or more beams from the TRP 205-a and the UE 115-a may receive a downlink signal 225 via one or more beams from the TRP 205-b. However, in some cases, the UE 115-a may experience a beam failure for one or more of the beams. For example, a blockage or other signal attenuation factors may degrade channel conditions such that a beam failure occurs. In such examples, the UE 115-a may be unable to successfully receive or decode communications via the beam, which may reduce communication quality, increase latency, and result in a relatively poor user experience.

In accordance with the techniques described herein, the TRPs 205 may configure the UE 115-a with BFD-RSs 210, QCL parameters, or a combination thereof. For example, the TRPs 205 may transmit one or more reference signal configurations 215. In some examples, the TRP 205-a may transmit a reference signal configuration associated with multiple TRPs 205. In some other examples, the wireless communications system 200 may support independent BFD-RS configuration per TRP 205 (e.g., each TRP 205 of multiple TRPs 205 may be associated with a set of BFD-RSs 210). For example, the TRP 205-a may transmit a first reference signal configuration 215 for multi TRP beam failure detection to the UE 115-a. The first reference signal configuration 215 may configure a first set of BFD-RSs 210 associated with the TRP 205-a. Additionally or alternatively, the TRP 205-b may transmit a second reference signal configuration 215. The second reference signal configuration 215 may configure a second set of BFD-RSs 210 associated with the TRP 205-b.

In some cases, the reference signal configuration 215 may be referred to as a BFD-RS configuration (e.g., a BFD-RS configuration per TRP). In some examples, the wireless communications system 200 may support explicit configuration of the reference signal configuration 215 (e.g., the TRP 205-a may transmit control information or signaling with fields that explicitly configure an associated BFD-RS set and the TRP 205-b may additionally or alternatively transmit second control information or signaling with fields that explicitly configure a second BFD-RS set). In some examples, the control signaling 220 may be an example of a downlink control information (DCI) message, an RRC message, or a MAC control element (CE) (MAC-CE) message, or any combination thereof, among other examples of control signaling 220. In some other examples, the wireless communications system 200 may support implicit configuration of the reference signal configuration 215.

A reference signal configuration 215 may indicate one or more BFD-RSs 210 associated with a respective TRP 205-a. For example, the UE 115-a may receive a reference signal configuration from one or more (e.g., each) of the TRPs 205 indicating at least one set of BFD-RSs 210. As an illustrative example, a reference signal configuration 215 may include an indication of resources for communication of the BFD-RSs 210 (e.g., resource elements allocated for reference signaling), a quantity of BFD-RSs 210 in a respective set of BFD-RSs 210, and the like. In some examples, the control signaling 220 may include an indication of a TCI state (e.g., the reference signal configuration 215 may include an indication of a TCI state and a QCL type, or the TCI state may be indicated via other control messages such as a DCI message, an RRC message, a MAC-CE message, or any combination thereof).

In some examples, a reference signal configuration 215 may indicate one or more QCL parameters associated with one or more sets of BFD-RSs 210. For example, the reference signal configuration 215 may indicate a set of BFD-RSs 210 associated with a corresponding TRP 205 or a QCL type associated with the set of BFD-RSs 210, or both. In some examples, the reference signal configuration 215 may explicitly indicate the QCL type (e.g., a field or indicator in the reference signal configuration 215 may indicate the QCL type) or the reference signal configuration 215 may implicitly indicate the QCL type (e.g., the UE 115-a may be pre-configured with a QCL type for the set of BFD-RSs 210 indicated by the reference signal configuration 215).

The QCL type may correspond to one or more QCL parameters. For example, a QCL type may correspond to a spatial filter parameter (e.g., a QCL type D). Additionally or alternatively, a QCL type may correspond to a Doppler shift, a Doppler spread, an average delay, a delay spread, or any combination thereof, among other examples of QCL parameters. Such QCL types may be examples of a QCL type A (e.g., a QCL type associated with a Doppler shift, a Doppler spread, an average delay, and a delay spread), a QCL type B (e.g., a QCL type associated with a Doppler shift and a Doppler spread), a QCL type C (e.g., a QCL type associated with a Doppler shift and an average delay), or any combination thereof, among other examples of QCL types (e.g., a QCL type associated with a delay spread, an average delay, or other QCL parameters).

The UE 115-a may determine a QCL type associated with one or more sets of BFD-RSs 210. In some examples, the UE 115-a may determine that a QCL type for the one or more sets of BFD-RSs 210 include a QCL type D (e.g., a QCL type associated with a spatial filter parameter). In some such cases, beam failure detection may be applied to a first frequency range (e.g., FR2 corresponding to deployments in 24-52.6 GHz ranges). For example, the UE may detect or otherwise monitor for beam failures for communications in the first frequency range based on receiving the BFD-RSs 210 using the spatial filter parameter. In some examples, beam failure detection may be inapplicable to another frequency range (e.g., FR1 corresponding to deployments in 410 MHz-7.125 GHz ranges) based on the QCL type for the BFD-RSs 210 being a QCL type D (e.g., the QCL spatial filter parameter may not be used for the other frequency range).

Additionally or alternatively, the UE 115-a may determine that one or more BFD-RSs 210 correspond to other QCL types, such as a QCL type A, B, C, or other QCL types. In some examples, the UE 115-a may determine that the one or more BFD-RSs 210 correspond to other QCL types based on an absence of a QCL type D. For example, if a QCL type D reference signal is unavailable (e.g., due to communications being in a frequency range that does not support a QCL type with a spatial filter parameter), the UE may identify a QCL type for a set of reference signals based on an indication in a TCI state (e.g., the TRPs 205 may indicate respective TCI states, each TCI state indicating a QCL type for a respective set of BFD-RSs 210). In other words, BFD-RSs 210 may be other reference signals in the TCI state other than QCL type D reference signals in the absence of QCL type D R reference signals Ss (e.g., other reference signals such as QCL type A, B, or C reference signals). The UE 115-a may receive one or more reference signals according to the reference signal configurations 215 and a QCL type. For example, the UE 115-a may monitor for a first set of BFD-RSs 210 on resources indicated by a respective reference signal configuration from the TRP 205-a. The UE 115-a may receive the first set of BFD-RSs 210 from the TRP 205-a, a second set of BFD-RSs 210 from the TRP 205-b, etc. The UE 115-a may receive a set of BFD-RSs 210 using a respective TRP type.

For example, two signals sent from a same antenna port of the TRP 205-a may experience a same radio channel or radio channel conditions. Signals sent from different antenna ports may experience different channel conditions. In some cases, if the different antenna ports are quasi co-located, the radio channels may have common properties or parameters. For example, QCL antenna ports may experience the same or similar Doppler spreads, Doppler shifts, average delay, delay spread, or spatial filter parameters, among other examples of QCL parameters. A Doppler shift may be an example of a shift in frequency of a radio signal relative to a motion of the UE 115-a (e.g., if the UE 115-a is in a high speed train deployment, the UE 115-a may experience a relatively high Doppler shift). A Doppler spread may be referred to as a fading rate (e.g., a difference between a signal frequency at the transmitter device and receiver device with respect to time may be referred to as a Doppler spread). An average delay may be an example of the average time for the UE 115-a to receive a signal from multiple paths (e.g., due to reflection and propagation of the signal paths in the environment) between the UE 115-*a* and a respective TRP 205. The delay spread may be an example of a difference between the time or arrival for an earliest path (e.g., a line of sight path) and a latest path. The spatial filter parameter may be an example of beamforming properties of a downlink received signal (e.g., an angle of arrival, an average angle of arrival, a dominant angle of arrival, and the like), and may also be referred to as a spatial receiver parameter.

Such QCL parameters may support the UE 115-*a* or the TRPs 205 to estimate channel conditions (e.g., frequency offset error estimation and synchronization procedures). As an example, the UE 115-*a* may determine QCL parameters associated with a first antenna port via a reference signal and apply the QCL parameters of the QCL type to other antenna ports that are quasi co-located with the first antenna port. As one illustrative example, the UE 115-*a* may receive the BFD-RSs 210 from a first antenna port and determine one or more QCL parameters based on receiving the BFD-RSs 210 and estimate channel conditions based on receiving the BFD-RSs 210 as described herein. The UE 115-*a* may apply the QCL parameters to another antenna port, such as an antenna used to transmit downlink information (e.g., physical downlink control channel (PDCCH) messages, physical downlink shared channel (PDSCH) messages, etc.) or other reference signals.

The UE 115-*a* may receive one or more sets of BFD-RSs 210 from one or more TRPs 205 in accordance with one or more QCL types. For example, the UE 115-*a* may determine that a set of BFD-RSs 210, or multiple sets of BFD-RSs 210, correspond to a QCL type D. The UE 115-*a* may estimate the channel in accordance with the QCL type D (e.g., using the spatial filter parameter of the BFD-RSs 210) and monitor for beam failures based on the estimating. In some cases, the UE 115-*a* may be configured (e.g., pre-configured or configured by a reference signal configuration 215) with the QCL type D for the one or more sets of BFD-RSs. Additionally or alternatively, the UE 115-*a* may determine that a set of BFD-RSs 210, or multiple sets of BFD-RSs 210, correspond to other QCL types. In some such examples, the UE 115-*a* may determine an absence of a QCL type D and use a QCL type indicated by a TCI state from a respective TRP 205.

The UE 115-*a* may detect a beam failure based on receiving the reference signals (e.g., the UE 115-*a* may determine that channel metrics of the BFD-RSs 210 associated with a beam may fail to satisfy one or more thresholds). The UE 115-*a* may initiate a beam failure recover procedure based on detecting a beam failure. As an illustrative example, the UE 115-*a* may transmit a beam failure report to one or more TRPs 205. For example, the UE 115-*a* may detect a beam failure for a beam of the TRP 205-*b* and transmit a report indicating a beam index of the failed beam to the TRP 205-*b*. The TRP 205-*b* may receive the report and adjust one or more parameters of the failed beam and switch beams to another beam in accordance with the beam recovery procedure, among other examples of beam recovery procedures. Thus, the devices in the wireless communications system 200 may detect beam failures and adjust one or more beams or parameters based on the detected beam failures, which may result in improved communications reliability, among other advantages.

Figure 3:
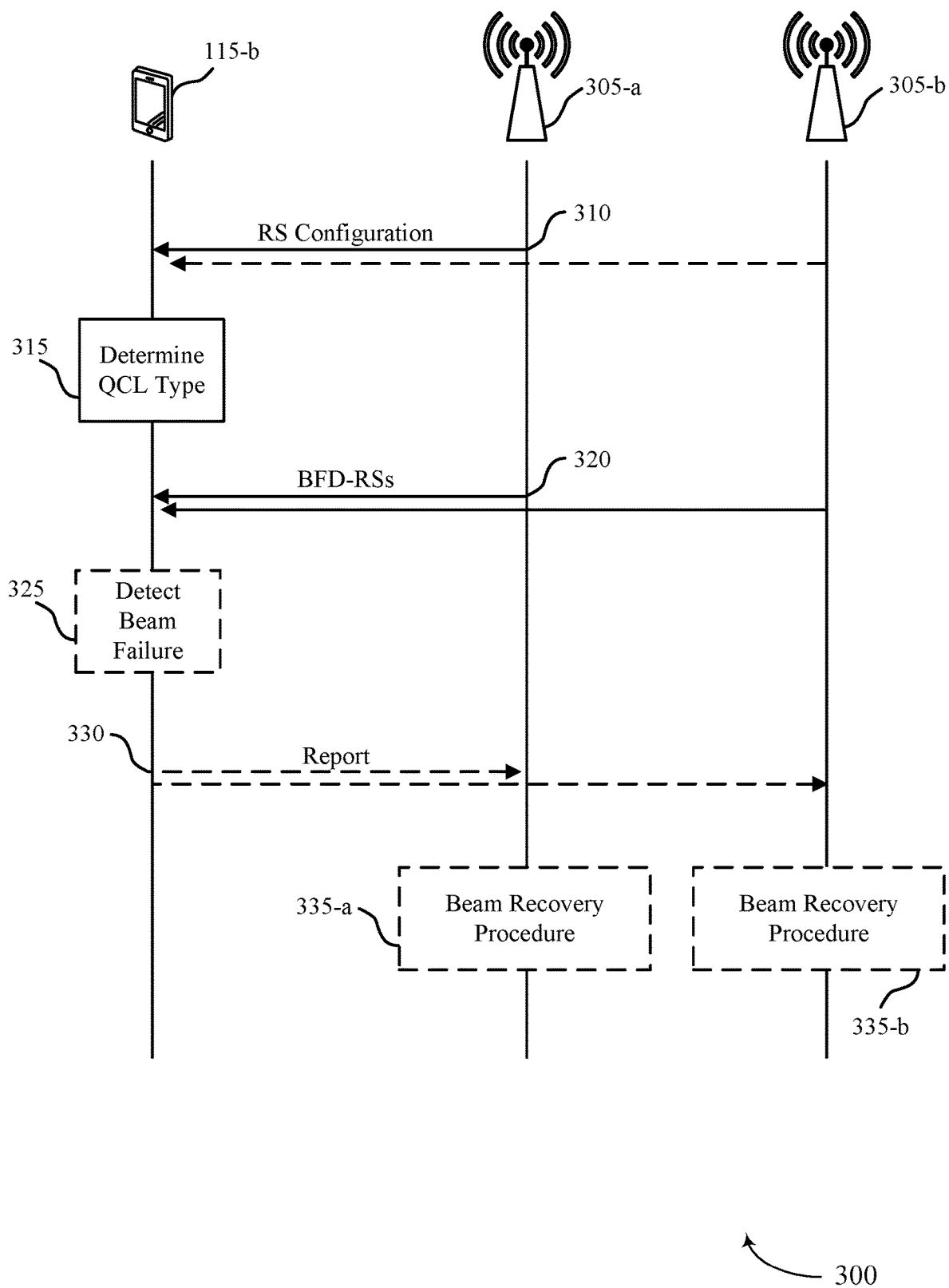
FIG. 3 illustrates an example of a process flow that supports techniques for BFD-RS in accordance with aspects of the present disclosure.

FIG. 3 illustrates an example of a process flow 300 that supports techniques for BFD-RS in accordance with aspects of the present disclosure. The process flow 300 may implement aspects of the wireless communications systems 100 and 200 or may be implemented by aspects of the wireless communications system 100 and 200 as described with reference to FIGS. 1 and 2. For example, the process flow 300 may be implemented by a TRP 305-*a*, a TRP 305-*b*, or a UE 115-*b*, which may be examples of corresponding devices as described herein. In the following description of the process flow 300, the operations between the TRP 305-*a*, the TRP 305-*b*, and the UE 115-*b* may be transmitted in a different order than the example order shown, or the operations performed by the TRP 305-*a*, the TRP 305-*b*, and the UE 115-*b* may be performed in different orders or at different times. Some operations may also be omitted from the process flow 300, and other operations may be added to the process flow 300.

At 310, the TRP 305-*a* or the TRP 305-*b*, or both, may transmit a reference signal configuration to the UE 115-*b* as described with reference to FIG. 2. For example, the TRP 305-*a* may transmit a first reference signal configuration indicating a first set of BFD-RSs, a corresponding QCL type, or both, to the UE 115-*b*. Additionally or alternatively, the TRP 305-*b* may transmit a second reference signal configuration indicating a second set of BFD-RSs, a corresponding QCL type, or both.

At 315, the UE 115-*b* may determine one or more QCL types associated with the one or more sets of BFD-RSs. For example, the UE 115-*b* may determine that the sets of BFD-RSs correspond to a QCL type D, or another QCL type (e.g., QCL type A, B, or C) indicated in a TCI state based on an absence of a QCL type D, as described herein with reference to FIG. 2.

At 320, the TRPs 305 may transmit BFD-RSs to the UE 115-*b* in accordance with the reference signal configuration (s) and the QCL type. The UE 115-*b* may receive the BFD-RSs in accordance with the reference signal configuration(s) and the QCL type and monitor for beam failures based on the BFD-RSs. In some cases, at 325 the UE 115-*b* may detect a beam failure. For example, one or more channel metrics determined based on receiving the BFD-RSs may fail to satisfy a threshold. In such cases, the UE 115-*b* may initiate a beam failure recovery procedure.

At 330, the UE 115-*b* may transmit one or more reports to the TRPs 305 indicating the beam failure (e.g., if beam failure is detected by the UE 115-*b*). In some examples, the TRPs 305 may perform a beam recovery procedure. For example, at 335-*a*, the TRP 305-*a* may adjust one or more parameters of a failed beam, switch from communicating using the indicated beam to communicating using another beam, or a combination thereof, among other examples of beam recovery procedures. Additionally or alternatively, at 335-*b*, the TRP 305-*b* may adjust one or more parameters of a failed beam, switch from communicating using the indicated beam to communicating using another beam, or a combination thereof, among other examples of beam recovery procedures.

Figure 4:
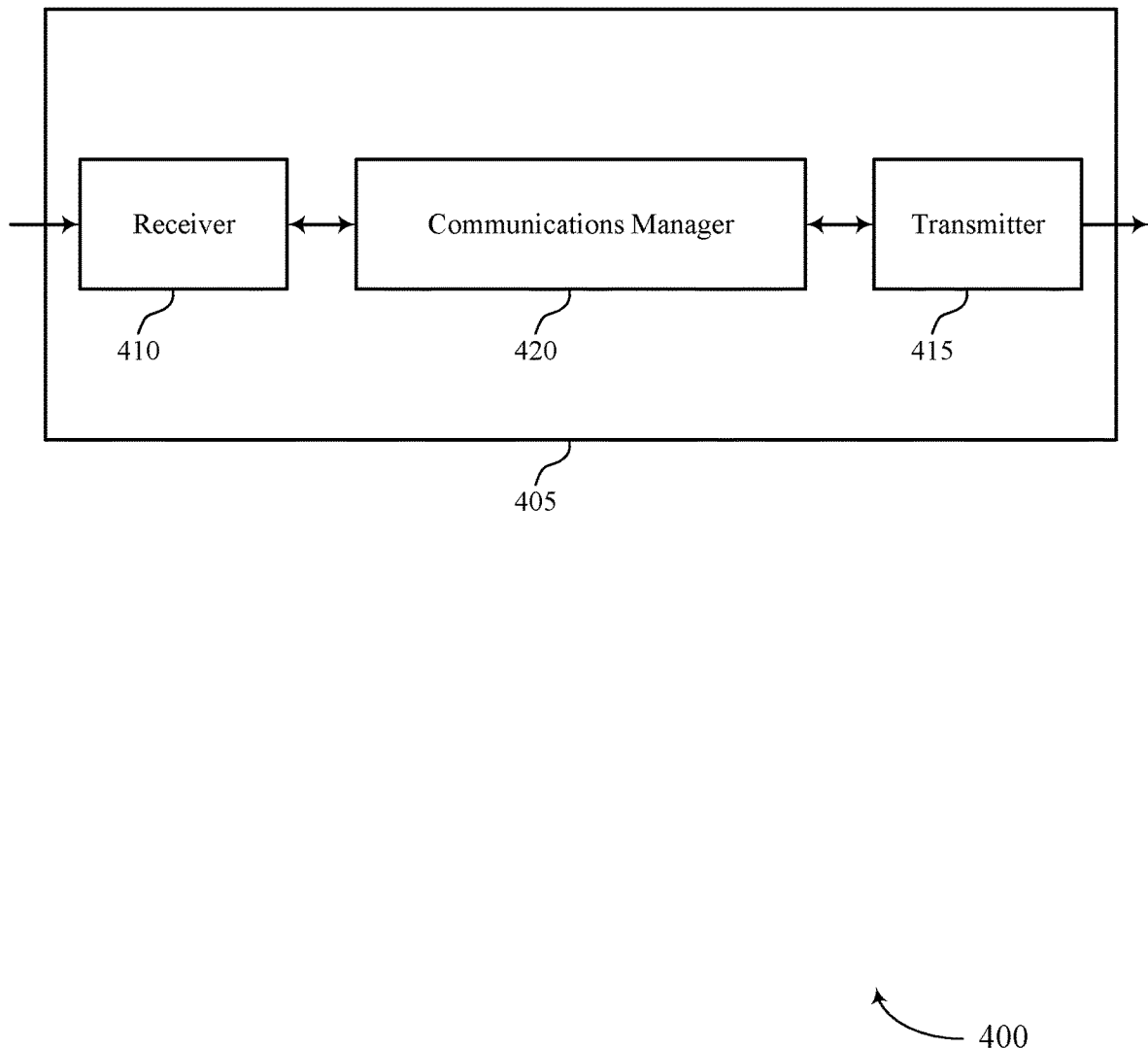
FIGS. 4 and 5 show block diagrams of devices that support techniques for BFD-RS in accordance with aspects of the present disclosure.

FIG. 4 shows a block diagram 400 of a device 405 that supports techniques for BFD-RS in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for BFD-RS). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for BFD-RS). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for BFD-RS as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving control signaling indicating a reference signal configuration indicating one or more BFD-RS and a QCL type associated with a set of multiple BFD-RS sets, where each BFD-RS set of the set of multiple BFD-RS sets is associated with a TRP of a set of multiple TRPs in communication with the UE. The communications manager 420 may be configured as or otherwise support a means for detecting a beam failure based on receiving a BFD-RS set using one or more beams according to the QCL type associated with the BFD-RS set. The communications manager 420 may be configured as or otherwise support a means for initiating a beam failure recovery procedure based on the detected beam failure. By including or configuring the communications manager 420 in accordance with examples as described herein, the device 405 (e.g., a processor controlling or otherwise coupled to the receiver 410, the transmitter 415, the communications manager 420, or a combination thereof) may support techniques for BFD-RS. For instance, by receiving the reference signals using a configured QCL type, the device 405 may reduce a processing complexity for detecting beam failures and detect beam failures with relatively more accuracy/speed, among other advantages.

Figure 5:
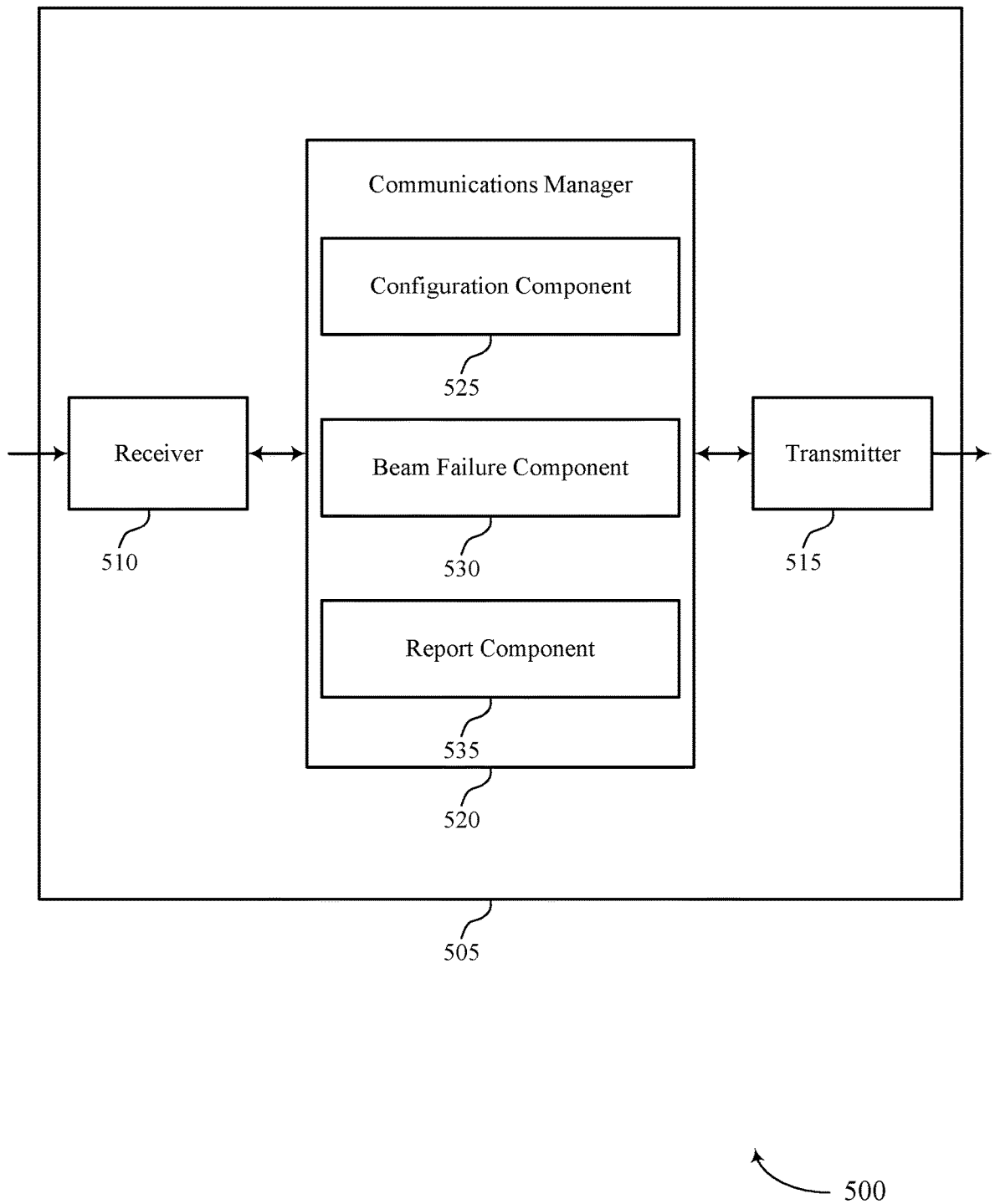

FIG. 5 shows a block diagram 500 of a device 505 that supports techniques for BFD-RS in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for BFD-RS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for BFD-RS). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for BFD-RS as described herein. For example, the communications manager 520 may include a reference signal configuration component 525, a beam failure component 530, a recovery component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The reference signal configuration component 525 may be configured as or otherwise support a means for receiving control signaling indicating a reference signal configuration indicating one or more BFD-RS and a QCL type associated with a set of multiple BFD-RS sets, where each BFD-RS set of the set of multiple BFD-RS sets is associated with a TRP of a set of multiple TRPs in communication with the UE. The beam failure component 530 may be configured as or otherwise support a means for detecting a beam failure based on receiving a BFD-RS set using one or more beams according to the QCL type associated with the BFD-RS set. The recovery component 535 may be configured as or otherwise support a means for initiating a beam failure recovery procedure based on the detected beam failure.

Figure 6:
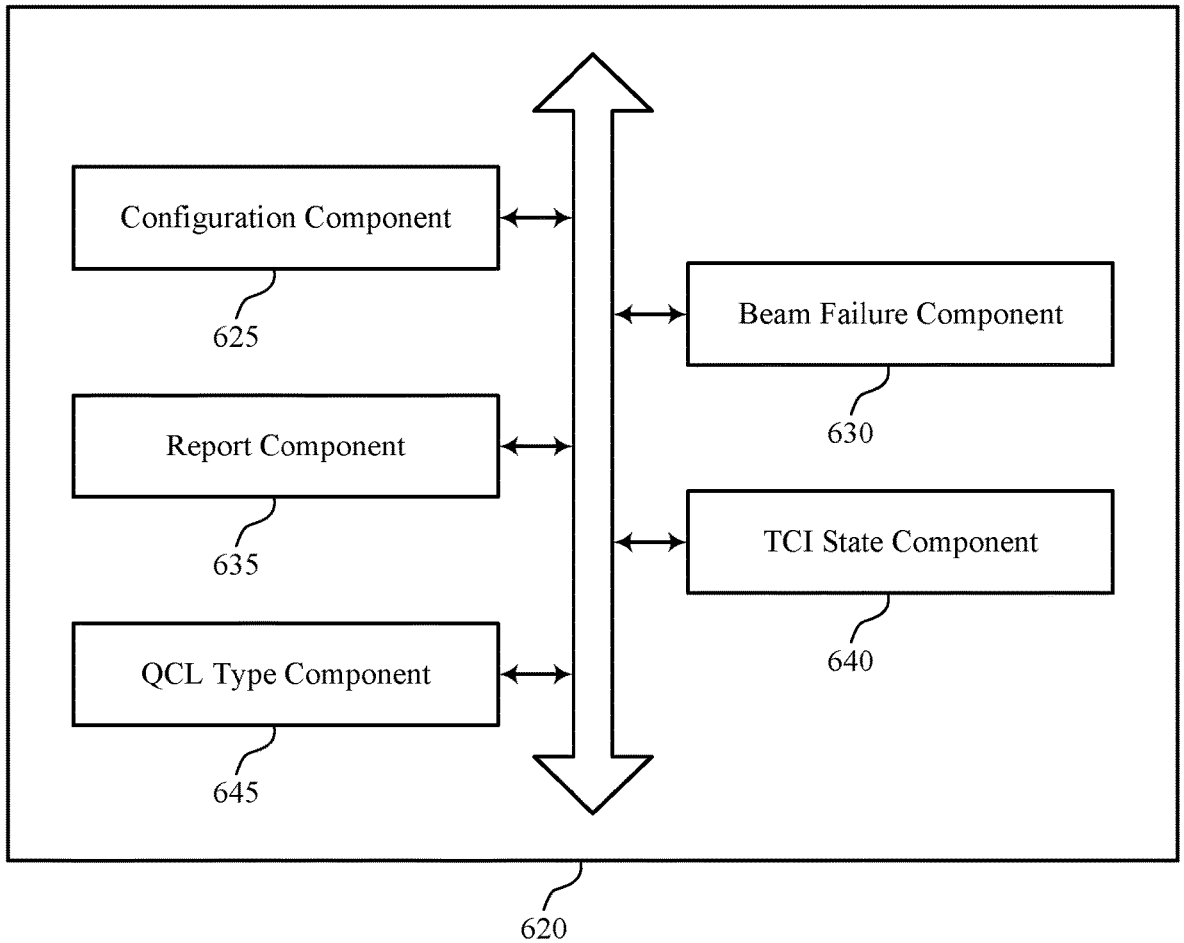
FIG. 6 shows a block diagram of a communications manager that supports techniques for BFD-RS in accordance with aspects of the present disclosure.

FIG. 6 shows a block diagram 600 of a communications manager 620 that supports techniques for BFD-RS in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for BFD-RS as described herein. For example, the communications manager 620 may include a configuration component 625, a beam failure component 630, a recovery component 635, a TCI state component 640, a QCL type component 645, or any combination thereof. Each of these components may communicate, directly or indirectly, with one another (e.g., via one or more buses).

The communications manager 620 may support wireless communications at a UE in accordance with examples as disclosed herein. The configuration component 625 may be configured as or otherwise support a means for receiving control signaling indicating a reference signal configuration indicating one or more BFD-RS and a QCL type associated with a set of multiple BFD-RS sets, where each BFD-RS set of the set of multiple BFD-RS sets is associated with a TRP of a set of multiple TRPs in communication with the UE. The beam failure component 630 may be configured as or otherwise support a means for detecting a beam failure based on receiving a BFD-RS set using one or more beams according to the QCL type associated with the BFD-RS set. The recovery component 635 may be configured as or otherwise support a means for initiating a beam failure recovery procedure based on the detected beam failure. In some examples, the QCL type associated with the set of multiple BFD-RS sets includes a QCL type corresponding to a spatial filter parameter applicable to a first frequency range and inapplicable to a second frequency range different from the first frequency range.

The TCI state component 640 may be configured as or otherwise support a means for receiving, in a message, a TCI state including an indication of the QCL type associated with the set of multiple BFD-RS sets. The QCL type associated with the set of multiple BFD-RS sets includes a QCL type corresponding to a Doppler shift, a Doppler spread, an average delay, a delay spread, or any combination thereof. In some examples, the message includes a DCI message. In some examples, the message includes a MAC-CE message. In some examples, the reference signal configuration includes the TCI state.

The QCL type component 645 may be configured as or otherwise support a means for determining that the QCL type associated with the set of multiple BFD-RS sets includes a QCL type corresponding to a Doppler shift, a Doppler spread, an average delay, a delay spread, or any combination thereof, based on an absence of the QCL type associated with the set of multiple BFD-RS sets including a QCL type corresponding to a spatial filter parameter. In some examples, the beam failure component 630 may be configured as or otherwise support a means for detecting the beam failure based on receiving the BFD-RS set of the set of multiple BFD-RS sets using the one or more beams according to the QCL type associated with the set of multiple BFD-RS sets including the QCL type corresponding to a Doppler shift, a Doppler spread, an average delay, a delay spread, or any combination thereof.

In some examples, to support receiving control signaling, the configuration component 625 may be configured as or otherwise support a means for receiving the control signaling indicating the reference signal configuration from the first TRP and a BFD-RS set corresponding to the first TRP. In some examples, the configuration component 625 may be configured as or otherwise support a means for receiving second control signaling indicating a second reference signal configuration from a second TRP, where the detected beam failure corresponds to the first TRP, the second TRP, or a combination thereof.

Figure 7:
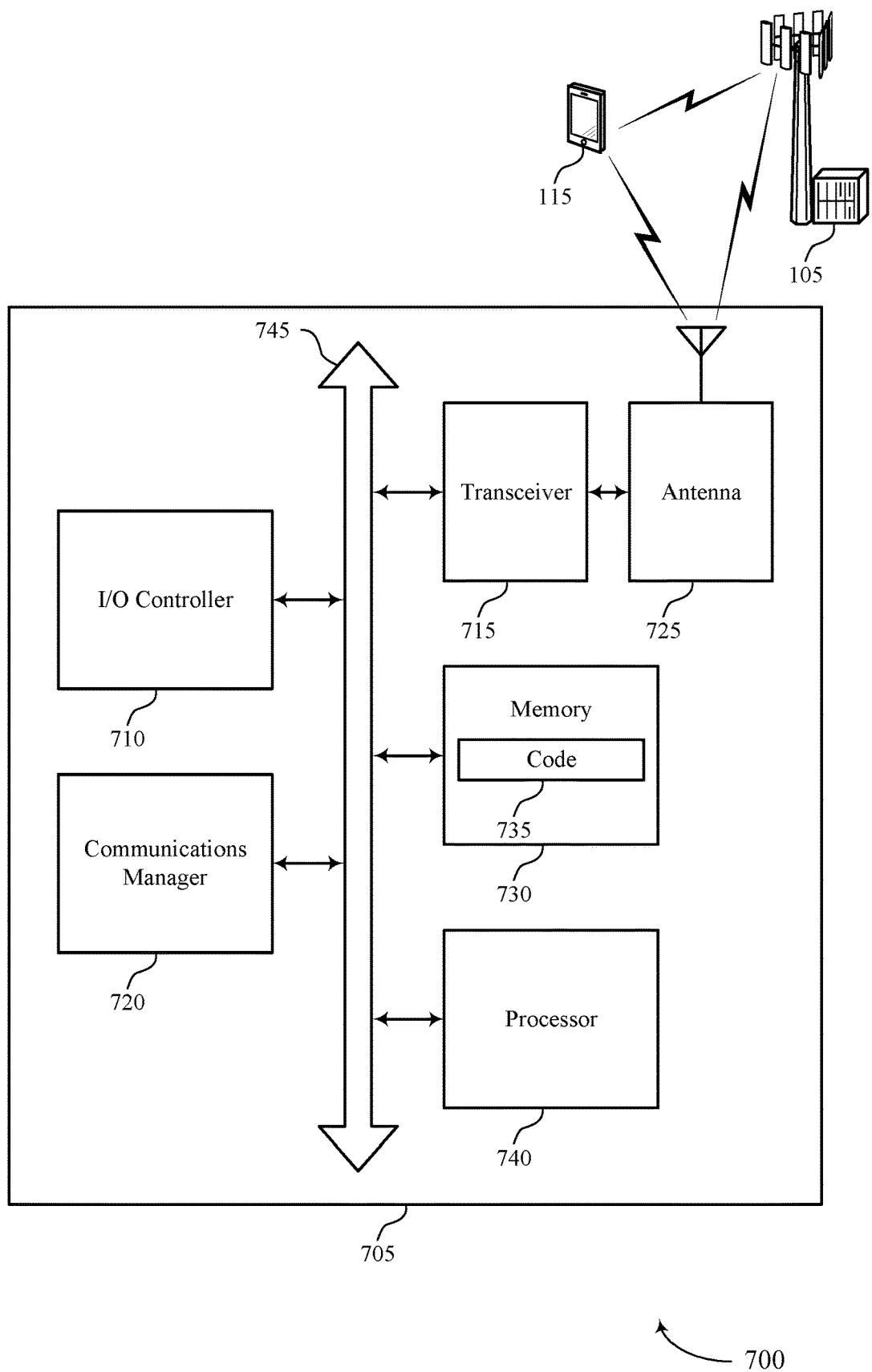
FIG. 7 shows a diagram of a system including a device that supports techniques for BFD-RS in accordance with aspects of the present disclosure.

FIG. 7 shows a diagram of a system 700 including a device 705 that supports techniques for BFD-RS in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for BFD-RS). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving control signaling indicating a reference signal configuration indicating one or more BFD-RS and a QCL type associated with a set of multiple BFD-RS sets, where each BFD-RS set of the set of multiple BFD-RS sets is associated with a TRP of a set of multiple TRPs in communication with the UE. The communications manager 720 may be configured as or otherwise support a means for detecting a beam failure based on receiving a BFD-RS set using one or more beams according to the QCL type associated with the BFD-RS set. The communications manager 720 may be configured as or otherwise support a means for initiating a beam failure recovery procedure based on the detected beam failure. By including or configuring the communications manager 720 in accordance with examples as described herein, the device 705 may support techniques for BFD-RS. For instance, by receiving the reference signals using a configured QCL type, the device 705 may be enabled to initiate beam failure recovery procedures with relatively higher accuracy or speed, which may improve communications reliability in a wireless communications system, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for BFD-RS as described herein, or the processor 740 and the memory 730 may be otherwise configured to perform or support such operations.

Figure 8:
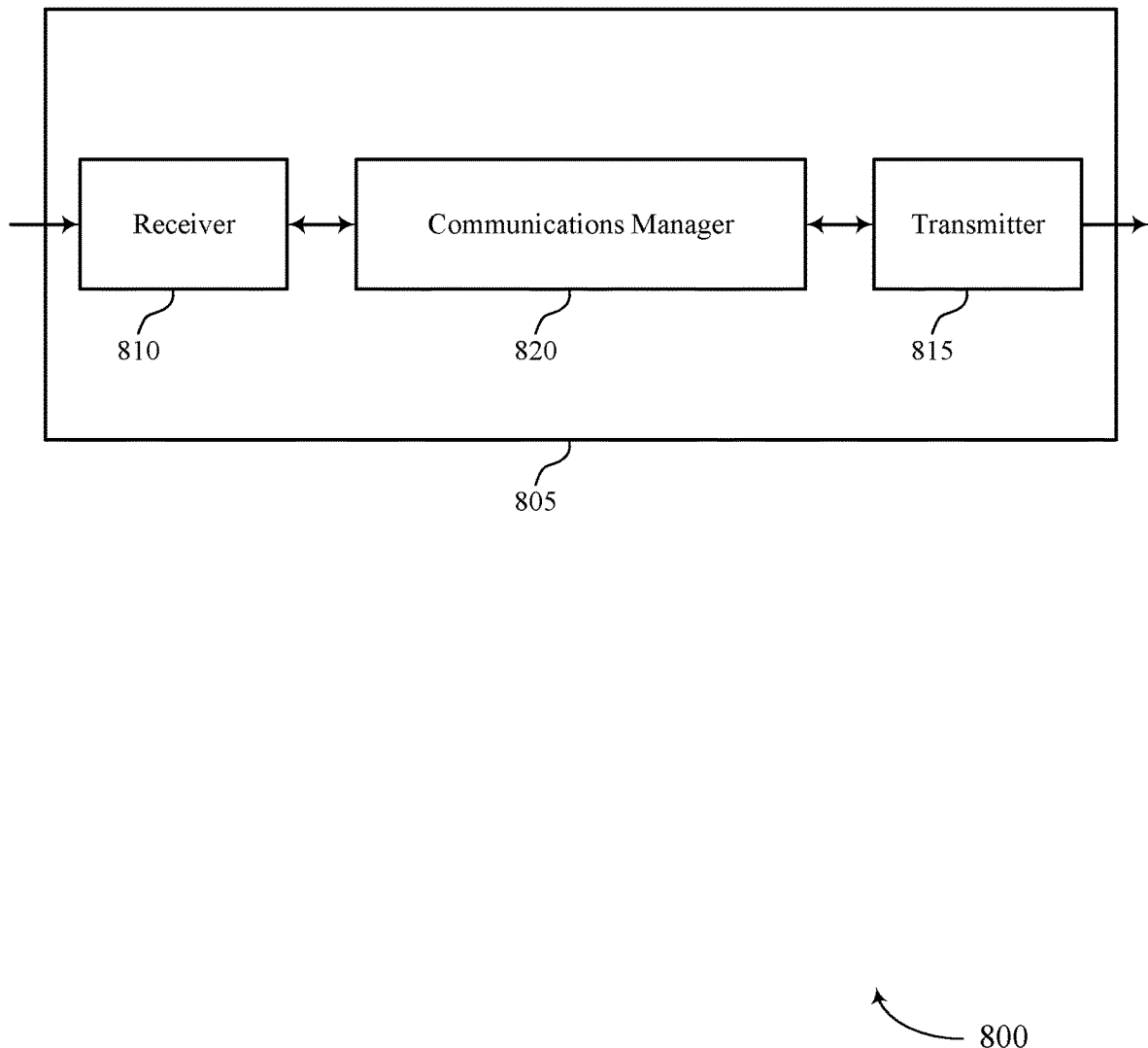
FIGS. 8 and 9 show block diagrams of devices that support techniques for BFD-RS in accordance with aspects of the present disclosure.

FIG. 8 shows a block diagram 800 of a device 805 that supports techniques for BFD-RS in accordance with aspects of the present disclosure. The device 805 may be an example of aspects of a TRP (e.g., a base station 105) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for BFD-RS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for BFD-RS). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for BFD-RS as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a TRP in accordance with examples as disclosed herein. For example, the communications manager 820 may be configured as or otherwise support a means for transmitting, to a UE, control signaling indicating a reference signal configuration indicating one or more BFD-RS and a QCL type associated with a set of multiple BFD-RS sets, where a BFD-RS set of the set of multiple BFD-RS sets is associated with the TRP. The communications manager 820 may be configured as or otherwise support a means for transmitting a BFD-RS set using one or more beams according to the QCL type associated with the BFD-RS set.

Figure 9:
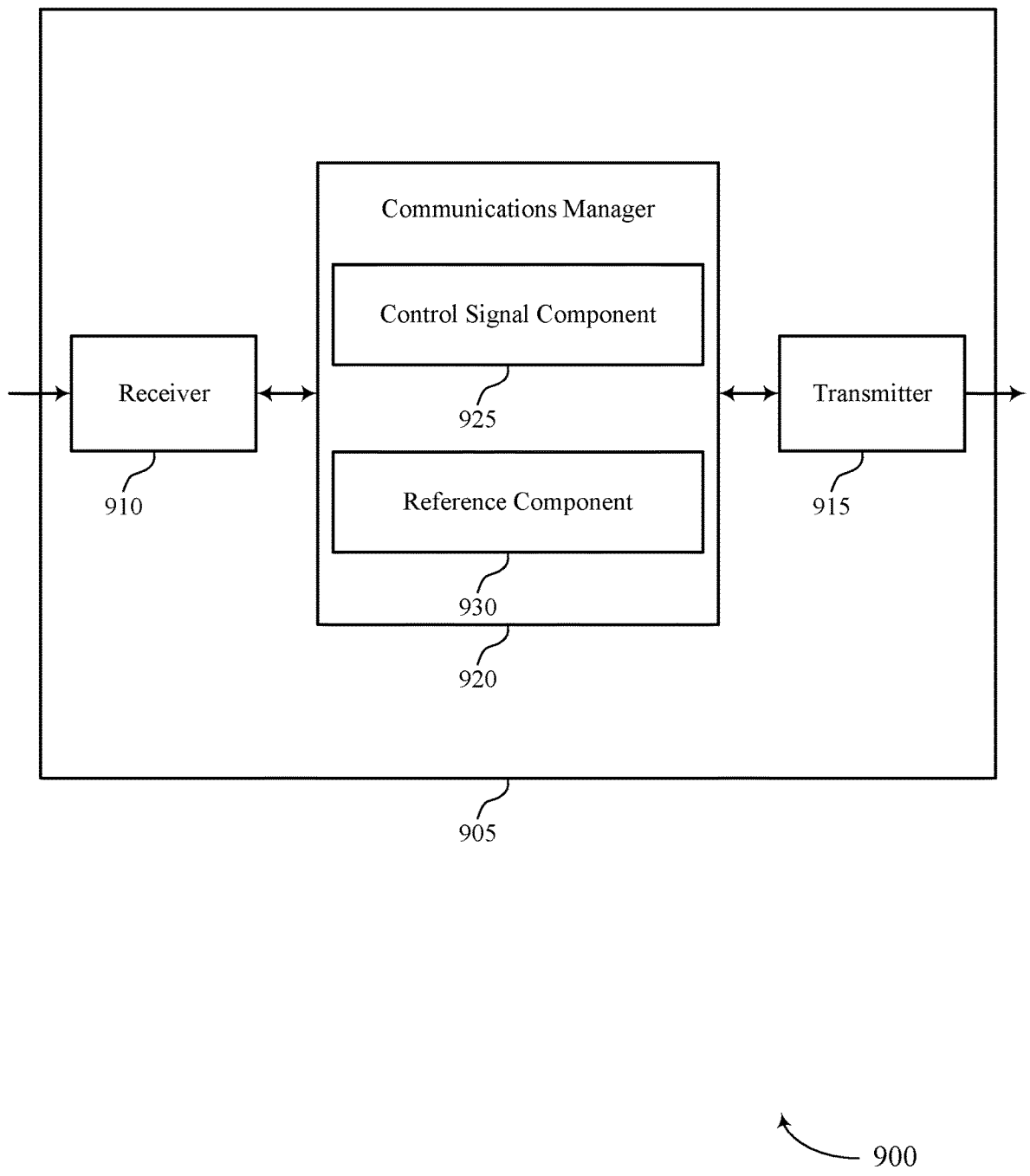

FIG. 9 shows a block diagram 900 of a device 905 that supports techniques for BFD-RS in accordance with aspects of the present disclosure. The device 905 may be an example of aspects of a device 805, a TRP (e.g., a base station 105), as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for BFD-RS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for BFD-RS). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for BFD-RS as described herein. For example, the communications manager 920 may include a control signal component 925 a reference component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a TRP in accordance with examples as disclosed herein. The control signal component 925 may be configured as or otherwise support a means for transmitting, to a UE, control signaling indicating a reference signal configuration indicating one or more BFD-RS and a QCL type associated with a set of multiple BFD-RS sets, where a BFD-RS set of the set of multiple BFD-RS sets is associated with the TRP. The reference component 930 may be configured as or otherwise support a means for transmitting a BFD-RS set using one or more beams according to the QCL type associated with the BFD-RS set.

Figure 10:
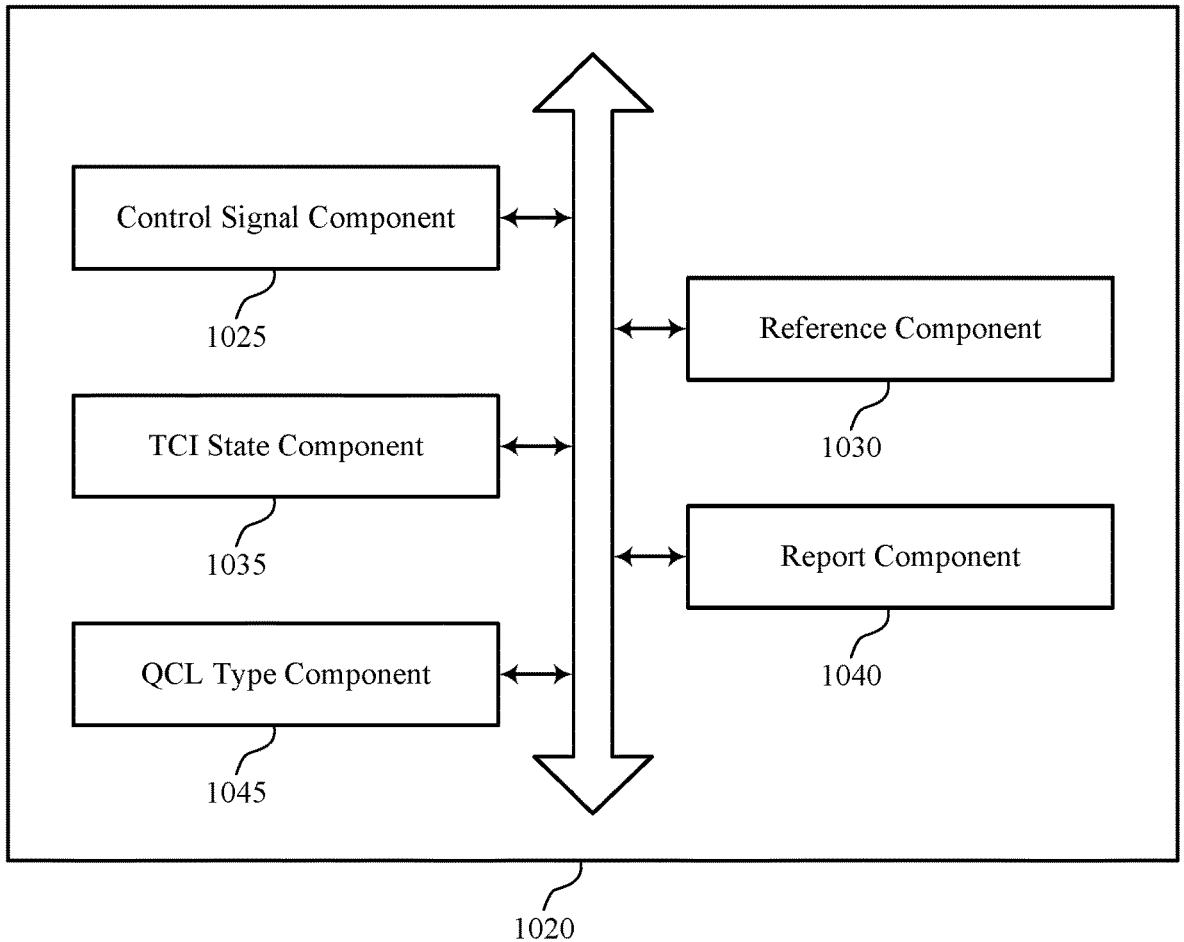
FIG. 10 shows a block diagram of a communications manager that supports techniques for BFD-RS in accordance with aspects of the present disclosure.

FIG. 10 shows a block diagram 1000 of a communications manager 1020 that supports techniques for BFD-RS in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for BFD-RS as described herein. For example, the communications manager 1020 may include a control signal component 1025, a reference component 1030, a TCI state component 1035, a report component 1040, a QCL type component 1045, or any combination thereof. Each of these components may communicate, directly or indirectly, with one another (e.g., via one or more buses).

The communications manager 1020 may support wireless communications at a TRP in accordance with examples as disclosed herein. The control signal component 1025 may be configured as or otherwise support a means for transmitting, to a UE, control signaling indicating a reference signal configuration indicating one or more BFD-RS and a QCL type associated with a set of multiple BFD-RS sets, where a BFD-RS set of the set of multiple BFD-RS sets is associated with the TRP. The reference component 1030 may be configured as or otherwise support a means for transmitting a BFD-RS set using one or more beams according to the QCL type associated with the BFD-RS set. In some examples, the QCL type associated with the set of multiple BFD-RS sets includes a QCL type corresponding to a spatial filter parameter applicable to a first frequency range and inapplicable to a second frequency range different from the first frequency range.

In some examples, the TCI state component 1035 may be configured as or otherwise support a means for transmitting, in a message, a TCI state including an indication of the QCL type associated with the set of multiple BFD-RS sets. In some examples, the TCI state component 1035 may be configured as or otherwise support a means for where the QCL type associated with the set of multiple BFD-RS sets includes a QCL type corresponding to a Doppler shift, a Doppler spread, an average delay, a delay spread, or any combination thereof. In some examples, the message includes a DCI message. In some examples, the message includes a MAC-CE message. In some examples, the reference signal configuration includes the TCI state.

The report component 1040 may be configured as or otherwise support a means for receiving a beam failure report based on transmitting the BFD-RS set. In some examples, the QCL type component 1045 may be configured as or otherwise support a means for determining that the QCL type associated with the set of multiple BFD-RS sets includes a QCL type corresponding to a Doppler shift, a Doppler spread, an average delay, a delay spread, or any combination thereof, based on an absence of the QCL type associated with the set of multiple BFD-RS sets including a QCL type corresponding to a spatial filter parameter. In some examples, the reference component 1030 may be configured as or otherwise support a means for transmitting one or more BFD-RS associated with a BFD-RS set of the set of multiple BFD-RS sets using the one or more beams according to the QCL type associated with the BFD-RS set including the QCL type corresponding to a Doppler shift, a Doppler spread, an average delay, a delay spread, or any combination thereof.

Figure 11:
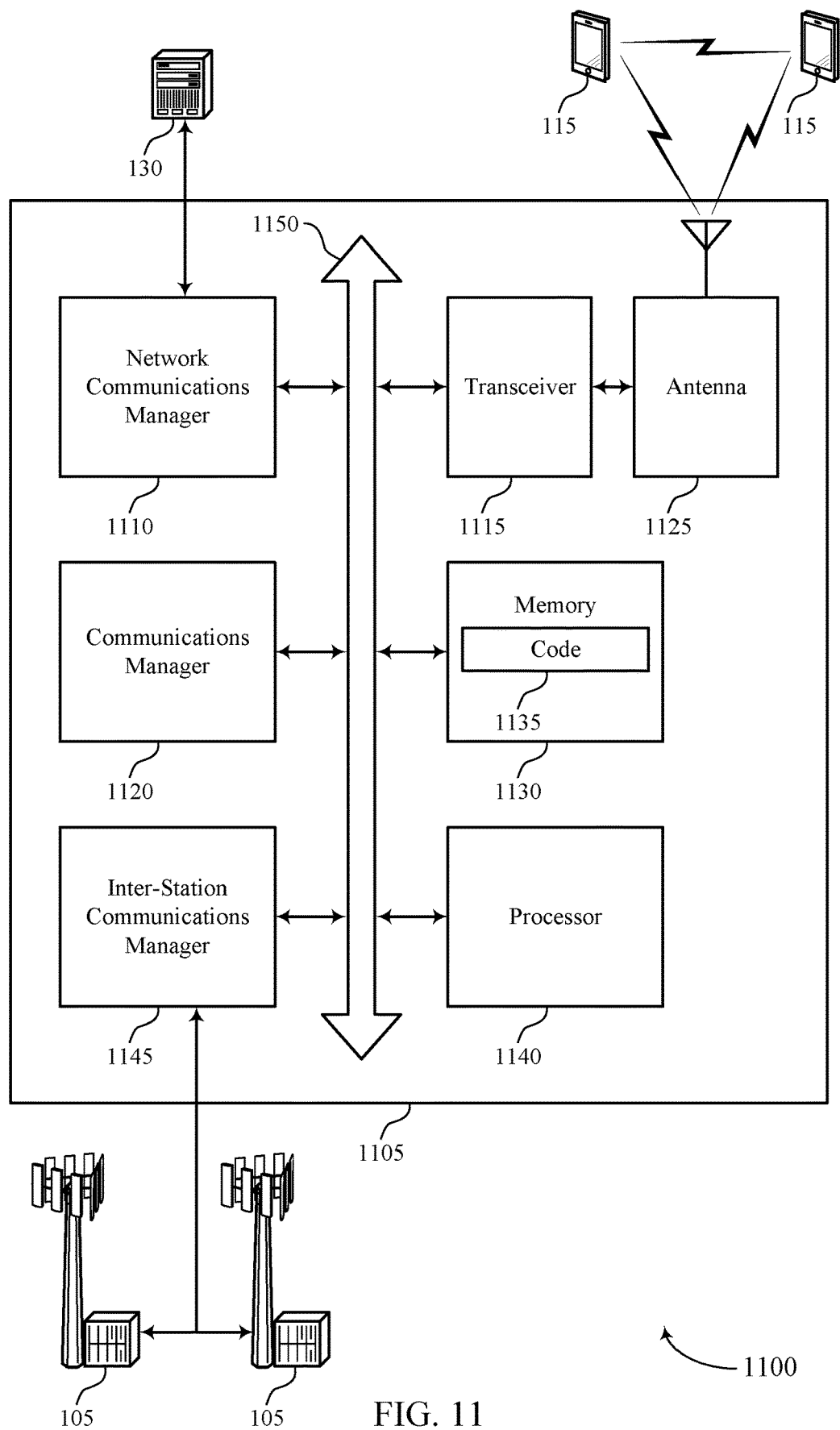
FIG. 11 shows a diagram of a system including a device that supports techniques for BFD-RS in accordance with aspects of the present disclosure.

FIG. 11 shows a diagram of a system 1100 including a device 1105 that supports techniques for BFD-RS in accordance with aspects of the present disclosure. The device 1105 may be an example of or include the components of a device 805, a device 905, a TRP (E.G., a base station 105) as described herein. The device 1105 may communicate wirelessly with one or more base stations 105, UEs 115, TRPs or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for BFD-RS). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a TRP in accordance with examples as disclosed herein. For example, the communications manager 1120 may be configured as or otherwise support a means for transmitting, to a UE, control signaling indicating a reference signal configuration indicating one or more BFD-RS and a QCL type associated with a set of multiple BFD-RS sets, where a BFD-RS set of the set of multiple BFD-RS sets is associated with the TRP. The communications manager 1120 may be configured as or otherwise support a means for transmitting a BFD-RS set using one or more beams according to the QCL type associated with the BFD-RS set.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for BFD-RS as described herein, or the processor 1140 and the memory 1130 may be otherwise configured to perform or support such operations.

Figure 12:
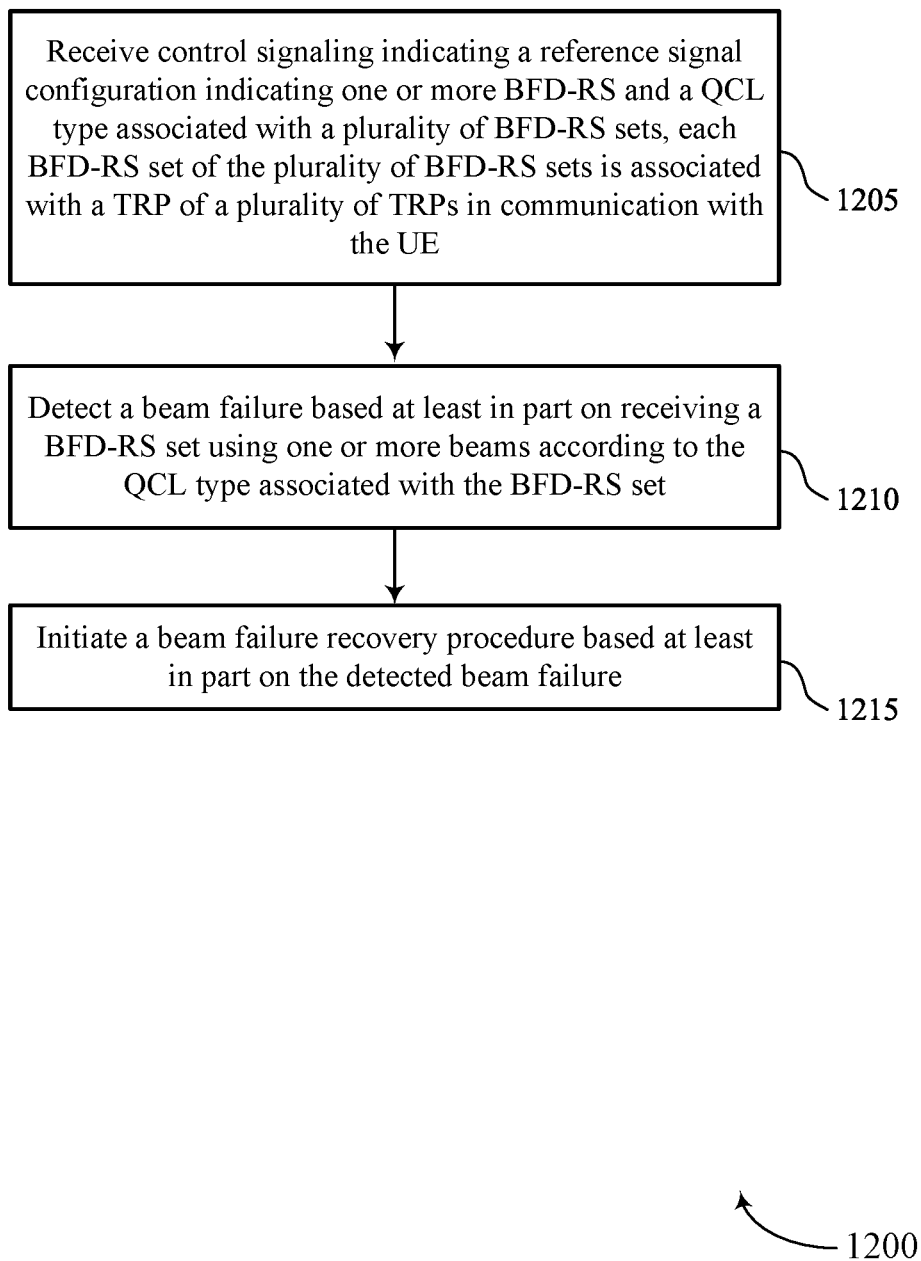
FIGS. 12 through 15 show flowcharts illustrating methods that support techniques for BFD-RS in accordance with aspects of the present disclosure.

FIG. 12 shows a flowchart illustrating a method 1200 that supports techniques for BFD-RS in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving control signaling indicating a reference signal configuration indicating one or more BFD-RS and a QCL type associated with a set of multiple BFD-RS sets, where each BFD-RS set of the set of multiple BFD-RS sets is associated with a TRP of a set of multiple TRPs in communication with the UE. The operations of 1205 may be performed in accordance with examples as disclosed herein. In some examples, aspects of the operations of 1205 may be performed by a configuration component 625 as described with reference to FIG. 6.

At 1210, the method may include detecting a beam failure based on receiving a BFD-RS set using one or more beams according to the QCL type associated with the BFD-RS set. The operations of 1210 may be performed in accordance with examples as disclosed herein. In some examples, aspects of the operations of 1210 may be performed by a beam failure component 630 as described with reference to FIG. 6.

At 1215, the method may include initiating a beam failure recovery procedure based on the detected beam failure. The operations of 1215 may be performed in accordance with examples as disclosed herein. In some examples, aspects of the operations of 1215 may be performed by a recovery component 635 as described with reference to FIG. 6.

Figure 13:
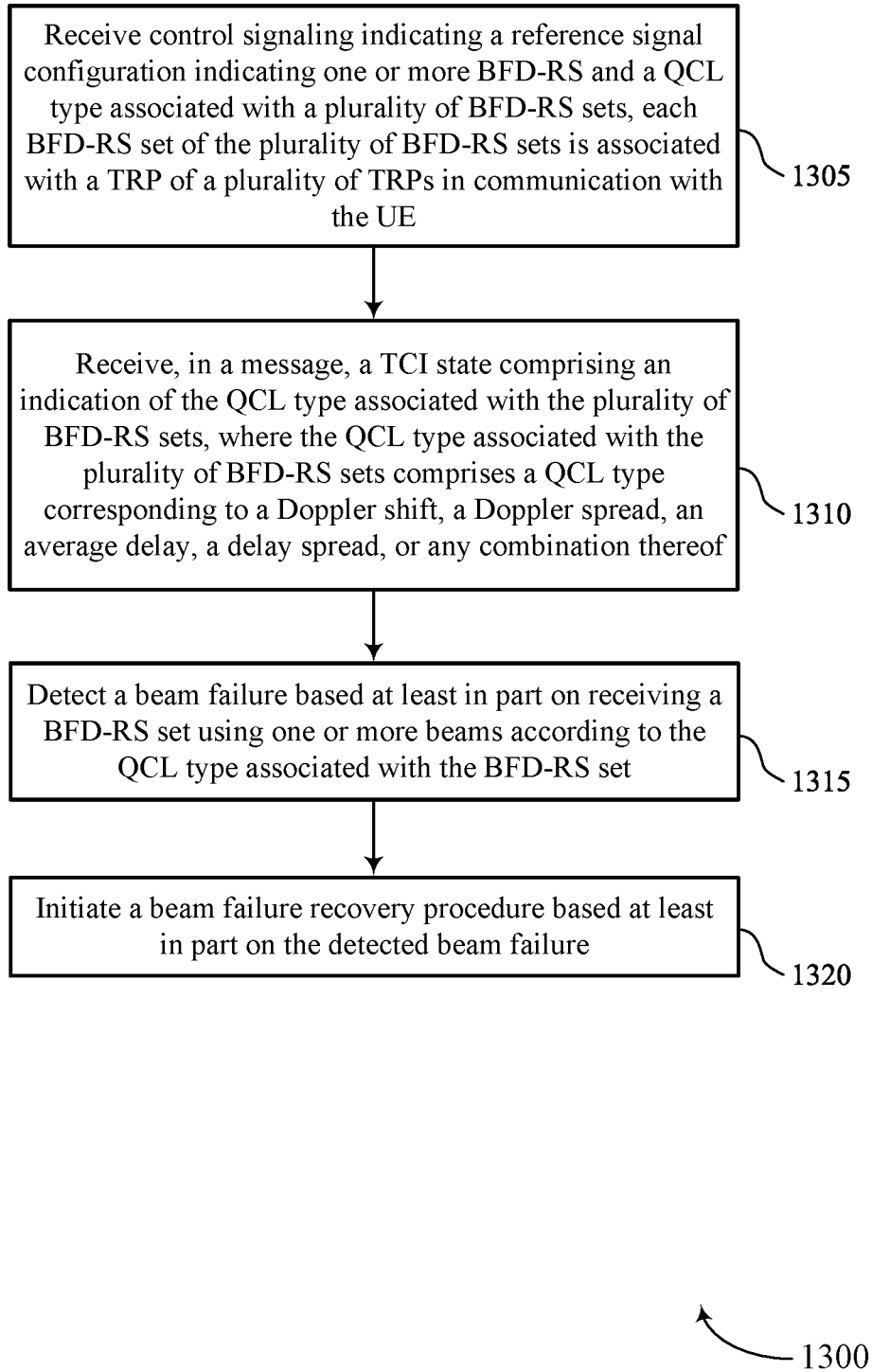

FIG. 13 shows a flowchart illustrating a method 1300 that supports techniques for BFD-RS in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a reference signal configuration indicating one or more BFD-RS and a QCL type associated with a plurality of BFD-RS sets, each BFD-RS set of the plurality of BFD-RS sets is associated with a TRP of a plurality of TRPs in communication with the UE. The operations of 1305 may be performed in accordance with examples as disclosed herein. In some examples, aspects of the operations of 1305 may be performed by a configuration component 625 as described with reference to FIG. 6.

At 1310, the method may include receiving, in a message, a TCI state comprising an indication of the QCL type associated with the plurality of BFD-RS sets, where the QCL type associated with the plurality of BFD-RS sets comprises a QCL type corresponding to a Doppler shift, a Doppler spread, an average delay, a delay spread, or any combination thereof. The operations of 1310 may be performed in accordance with examples as disclosed herein. In some examples, aspects of the operations of 1310 may be performed by a TCI state component 640 as described with reference to FIG. 6.

At 1315, the method may include detecting a beam failure based at least in part on receiving a BFD-RS set using one or more beams according to the QCL type associated with the BFD-RS set. The operations of 1315 may be performed in accordance with examples as disclosed herein. In some examples, aspects of the operations of 1315 may be performed by a beam failure component 630 as described with reference to FIG. 6.

At 1320, the method may include initiating a beam failure recovery procedure based at least in part on the detected beam failure. The operations of 1320 may be performed in accordance with examples as disclosed herein. In some examples, aspects of the operations of 1320 may be performed by a recovery component 635 as described with reference to FIG. 6.

Figure 14:
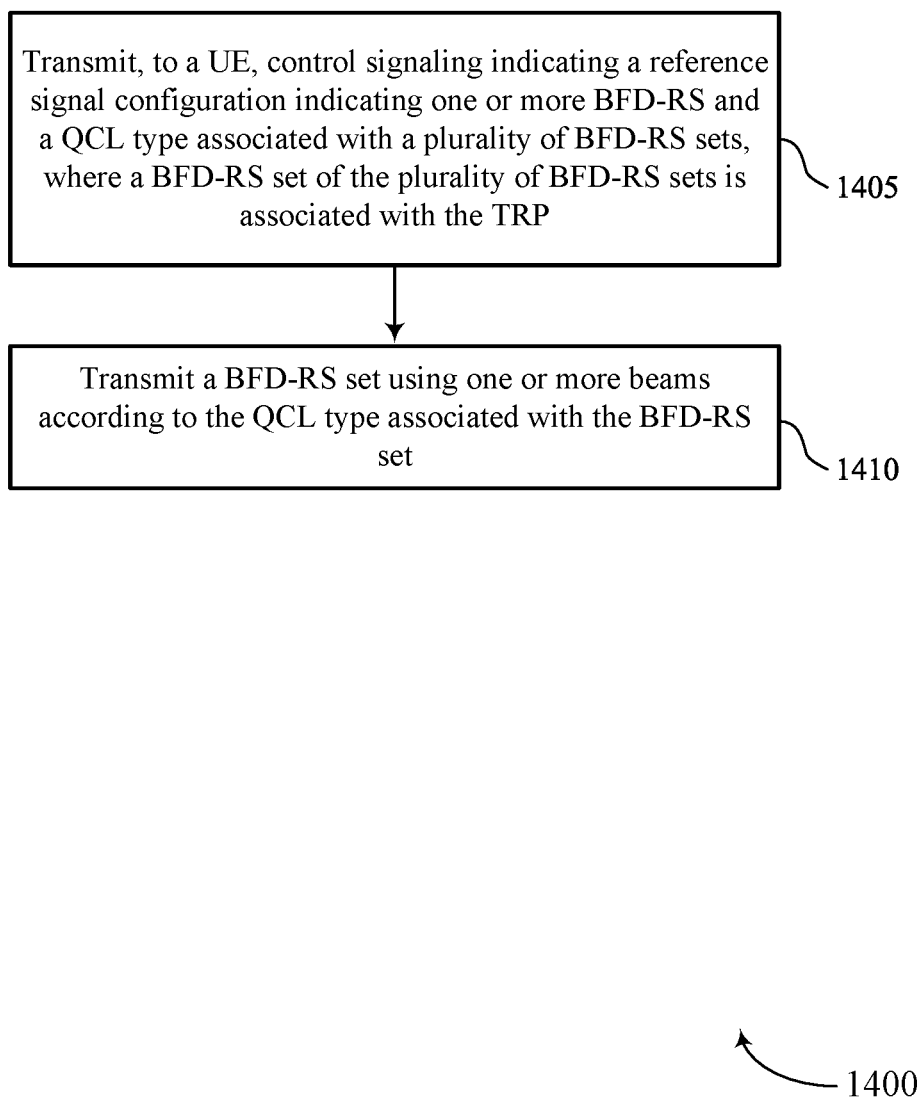

FIG. 14 shows a flowchart illustrating a method 1400 that supports techniques for BFD-RS in accordance with aspects of the present disclosure. The operations of the method 1400 may be implemented by a base station or its components as described herein. For example, the operations of the method 1400 may be performed by a TRP (e.g., a base station) as described with reference to FIGS. 1 through 3 and 8 through 11. In some examples, a TRP may execute a set of instructions to control the functional elements of the base station to perform the described functions. Additionally or alternatively, the TRP may perform aspects of the described functions using special-purpose hardware.

At 1405, the method may include transmitting, to a UE, control signaling indicating a reference signal configuration indicating one or more BFD-RS and a QCL type associated with a set of multiple BFD-RS sets, where a BFD-RS set of the set of multiple BFD-RS sets is associated with the TRP. The operations of 1405 may be performed in accordance with examples as disclosed herein. In some examples, aspects of the operations of 1405 may be performed by a control signal component 1025 as described with reference to FIG. 10.

At 1410, the method may include transmitting a BFD-RS set using one or more beams according to the QCL type associated with the BFD-RS set. The operations of 1410 may be performed in accordance with examples as disclosed herein. In some examples, aspects of the operations of 1410 may be performed by a reference component 1030 as described with reference to FIG. 10.

Figure 15:
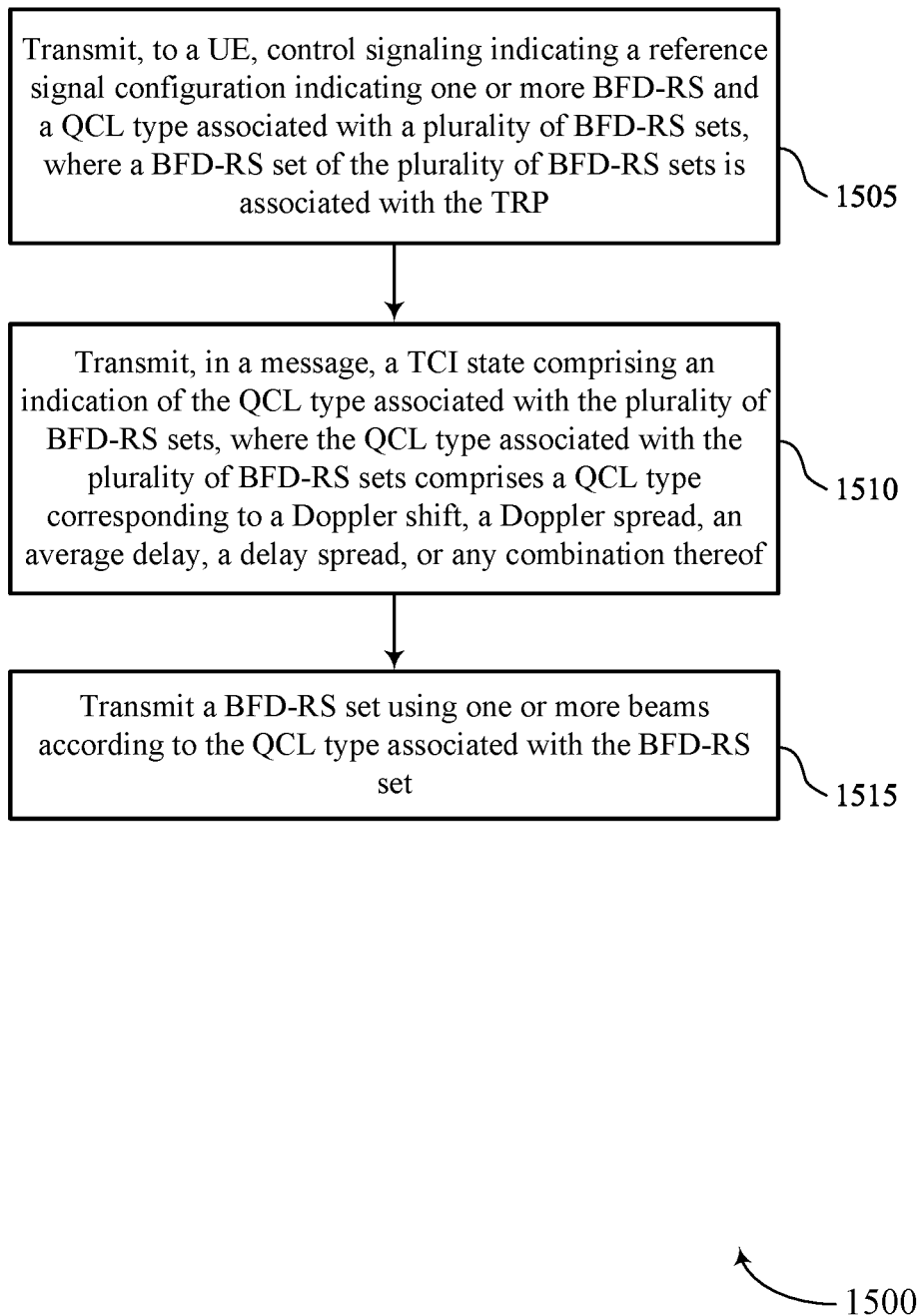

FIG. 15 shows a flowchart illustrating a method 1500 that supports techniques for BFD-RS in accordance with aspects of the present disclosure. The operations of the method 1500 may be implemented by a base station or its components as described herein. For example, the operations of the method 1500 may be performed by a TRP (e.g., a base station) as described with reference to FIGS. 1 through 3 and 8 through 11. In some examples, a TRP may execute a set of instructions to control the functional elements of the base station to perform the described functions. Additionally or alternatively, the TRP may perform aspects of the described functions using special-purpose hardware.

At 1505, the method may include transmitting, to a UE, control signaling indicating a reference signal configuration indicating one or more BFD-RS and a QCL type associated with a plurality of BFD-RS sets, where a BFD-RS set of the plurality of BFD-RS sets is associated with the TRP. The operations of 1505 may be performed in accordance with examples as disclosed herein. In some examples, aspects of the operations of 1505 may be performed by a control signal component 1025 as described with reference to FIG. 10.

At 1510, the method may include transmitting, in a message, a TCI state comprising an indication of the QCL type associated with the plurality of BFD-RS sets, where the QCL type associated with the plurality of BFD-RS sets comprises a QCL type corresponding to a Doppler shift, a Doppler spread, an average delay, a delay spread, or any combination thereof. The operations of 1510 may be performed in accordance with examples as disclosed herein. In some examples, aspects of the operations of 1510 may be performed by a TCI state component 1035 as described with reference to FIG. 10.

At 1520, the method may include transmitting a BFD-RS set using one or more beams according to the QCL type associated with the BFD-RS set. The operations of 1520 may be performed in accordance with examples as disclosed herein. In some examples, aspects of the operations of 1520 may be performed by a reference component 1030 as described with reference to FIG. 10.

The following provides an overview of aspects of the present disclosure:

Aspect 1: A method for wireless communications at a UE, comprising: receiving control signaling indicating a reference signal configuration indicating one or more BFD-RSs and a QCL type associated with a plurality of BFD-RS sets, wherein each BFD-RS set of the plurality of BFD-RS sets is associated with a TRP of a plurality of TRPs in communication with the UE; detecting a beam failure based at least in part on receiving a BFD-RS set using one or more beams according to the QCL type associated with the BFD-RS set; and initiating a beam failure recovery procedure based at least in part on the detected beam failure.

Aspect 2: The method of aspect 1, wherein the QCL type associated with the plurality of BFD-RS sets comprises a QCL type corresponding to a spatial filter parameter applicable to a first frequency range and inapplicable to a second frequency range different from the first frequency range.

Aspect 3: The method of aspect 1, further comprising: receiving, in a message, a TCI state comprising an indication of the QCL type associated with the plurality of BFD-RS sets, wherein the QCL type associated with the plurality of BFD-RS sets comprises a QCL type corresponding to a Doppler shift, a Doppler spread, an average delay, a delay spread, or any combination thereof.

Aspect 4: The method of aspect 3, wherein the message comprises a downlink control information message.

Aspect 5: The method of any of aspects 3 through 4, wherein the message comprises a medium access control-control element message.

Aspect 6: The method of any of aspects 3 through 5, wherein the reference signal configuration comprises the TCI state.

Aspect 7: The method of aspect 1, further comprising: determining that the QCL type associated with the plurality of BFD-RS sets comprises a QCL type corresponding to a Doppler shift, a Doppler spread, an average delay, a delay spread, or any combination thereof, based at least in part on an absence of the QCL type associated with the plurality of BFD-RS sets comprising a QCL type corresponding to a spatial filter parameter.

Aspect 8: The method of aspect 7, further comprising: detecting the beam failure based at least in part on receiving the BFD-RS set of the plurality of BFD-RS sets using the one or more beams according to the QCL type associated with the plurality of BFD-RS sets comprising the QCL type corresponding to a Doppler shift, a Doppler spread, an average delay, a delay spread, or any combination thereof.

Aspect 9: The method of any of aspects 1 through 8, wherein receiving control signaling comprises: receiving the control signaling indicating the reference signal configuration from the first TRP and a BFD-RS set corresponding to the first TRP.

Aspect 10: The method of aspect 9, further comprising: receiving second control signaling indicating a second reference signal configuration from a second TRP, wherein the detected beam failure corresponds to the first TRP, the second TRP, or a combination thereof.

Aspect 11: A method for wireless communications at a TRP, comprising: transmitting, to a UE, control signaling indicating a reference signal configuration indicating one or more BFD-RSs and a QCL type associated with a plurality of BFD-RS sets, wherein a BFD-RS set of the plurality of BFD-RS sets is associated with the TRP; and transmitting a BFD-RS set using one or more beams according to the QCL type associated with the BFD-RS set.

Aspect 12: The method of aspect 11, wherein the QCL type associated with the plurality of BFD-RS sets comprises a QCL type corresponding to a spatial filter parameter applicable to a first frequency range and inapplicable to a second frequency range different from the first frequency range.

Aspect 13: The method of aspect 11, further comprising: transmitting, in a message, a TCI state comprising an indication of the QCL type associated with the plurality of BFD-RS sets, wherein the QCL type associated with the plurality of BFD-RS sets comprises a QCL type corresponding to a Doppler shift, a Doppler spread, an average delay, a delay spread, or any combination thereof.

Aspect 14: The method of aspect 13, wherein the message comprises a downlink control information message.

Aspect 15: The method of any of aspects 13 through 14, wherein the message comprises a medium access control-control element message.

Aspect 16: The method of any of aspects 13 through 15, wherein the reference signal configuration comprises the TCI state.

Aspect 17: The method of any of aspects 11 through 16, further comprising: receiving a beam failure report based at least in part on transmitting the BFD-RS set.

Aspect 18: The method of any of aspects 11 through 17, further comprising: determining that the QCL type associated with the plurality of BFD-RS sets comprises a QCL type corresponding to a Doppler shift, a Doppler spread, an average delay, a delay spread, or any combination thereof, based at least in part on an absence of the QCL type associated with the plurality of BFD-RS sets comprising a QCL type corresponding to a spatial filter parameter.

Aspect 19: The method of aspect 18, further comprising: transmitting one or more BFD-RSs associated with a BFD-RS set of the plurality of BFD-RS sets using the one or more beams according to the QCL type associated with the BFD-RS set comprising the QCL type corresponding to a Doppler shift, a Doppler spread, an average delay, a delay spread, or any combination thereof.

Aspect 20: An apparatus for wireless communications at a UE, comprising a processor; memory coupled with the processor; and instructions stored in the memory and executable by the processor to cause the apparatus to perform a method of any of aspects 1 through 10.

Aspect 21: An apparatus for wireless communications at a UE, comprising at least one means for performing a method of any of aspects 1 through 10.

Aspect 22: A non-transitory computer-readable medium storing code for wireless communications at a UE, the code comprising instructions executable by a processor to perform a method of any of aspects 1 through 10.

Aspect 23: An apparatus for wireless communications at a TRP, comprising a processor; memory coupled with the processor; and instructions stored in the memory and executable by the processor to cause the apparatus to perform a method of any of aspects 11 through 19.

Aspect 24: An apparatus for wireless communications at a TRP, comprising at least one means for performing a method of any of aspects 11 through 19.

Aspect 25: A non-transitory computer-readable medium storing code for wireless communications at a TRP, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving control signaling indicating a reference signal configuration indicating one or more beam failure detection reference signal sets and a quasi co-location type associated with a plurality of beam failure detection reference signal sets including the one or more beam failure detection reference signal sets, wherein each beam failure detection reference signal set of the plurality of beam failure detection reference signal sets is associated with a respective transmission-reception point of a plurality of transmission-reception points in communication with the UE;
detecting a beam failure based at least in part on receiving the one or more beam failure detection reference signal sets of the plurality of beam failure detection reference signal sets using one or more beams and in accordance with the quasi co-location type associated with the plurality of beam failure detection reference signal sets, wherein the quasi co-location type corresponds to a Doppler shift, a Doppler spread, an average delay, a delay spread, or any combination thereof; and
initiating a beam failure recovery procedure based at least in part on the detected beam failure.

2. The method of claim 1, wherein the quasi co-location type associated with the plurality of beam failure detection reference signal sets comprises a quasi co-location type corresponding to a spatial filter parameter applicable to a first frequency range and inapplicable to a second frequency range different from the first frequency range.

3. The method of claim 1, further comprising:
receiving, in a message, a transmission configuration indicator state comprising an indication of the quasi co-location type associated with the plurality of beam failure detection reference signal sets.

4. The method of claim 3, wherein the message comprises a downlink control information message.

5. The method of claim 3, wherein the message comprises a medium access control-control element message.

6. The method of claim 3, wherein the reference signal configuration comprises the transmission configuration indicator state.

7. The method of claim 1, wherein receiving control signaling comprises:
receiving the control signaling indicating the reference signal configuration from a first transmission-reception point and a beam failure detection reference signal set corresponding to the first transmission-reception point.

8. The method of claim 7, further comprising:
receiving second control signaling indicating a second reference signal configuration from a second transmission-reception point, wherein the detected beam failure corresponds to the first transmission-reception point, the second transmission-reception point, or a combination thereof.

9. A method for wireless communications at a transmission-reception point, comprising:
transmitting, to a user equipment (UE), control signaling indicating a reference signal configuration indicating one or more beam failure detection reference signal sets and a quasi co-location type associated with a plurality of beam failure detection reference signal sets including the one or more beam failure detection reference signal sets, wherein at least one beam failure detection reference signal set of the one or more beam failure detection reference signal sets is associated with the transmission-reception point; and
transmitting the at least one beam failure detection reference signal set of the one or more beam failure detection reference signal sets using one or more beams and in accordance with the quasi co-location type associated with the plurality of beam failure detection reference signal sets, wherein the quasi co-location type corresponds to a Doppler shift, a Doppler spread, an average delay, a delay spread, or any combination thereof.

10. The method of claim 9, wherein the quasi co-location type associated with the plurality of beam failure detection reference signal sets comprises a quasi co-location type corresponding to a spatial filter parameter applicable to a first frequency range and inapplicable to a second frequency range different from the first frequency range.

11. The method of claim 9, further comprising:
transmitting, in a message, a transmission configuration indicator state comprising an indication of the quasi co-location type associated with the plurality of beam failure detection reference signal sets.

12. The method of claim 11, wherein the message comprises a downlink control information message.

13. The method of claim 11, wherein the message comprises a medium access control-control element message.

14. The method of claim 11, wherein the reference signal configuration comprises the transmission configuration indicator state.

15. The method of claim 9, further comprising:
receiving a beam failure report based at least in part on transmitting the at least one beam failure detection reference signal set.

16. A user equipment (UE) for wireless communications, comprising:
one or more memories storing processor-executable code; and
one or more processors coupled with the one or more memories and operable to execute the code to cause the UE to:
receive control signaling indicating a reference signal configuration indicating one or more beam failure detection reference signal sets and a quasi co-location type associated with a plurality of beam failure detection reference signal sets including the one or more beam failure detection reference signal sets, wherein each beam failure detection reference signal set of the plurality of beam failure detection reference signal sets is associated with a respective transmission-reception point of a plurality of transmission-reception points in communication with the UE;
detect a beam failure based at least in part on receiving the one or more beam failure detection reference signal sets of the plurality of beam failure detection reference signal sets using one or more beams and in accordance with the quasi co-location type associated with the plurality of beam failure detection reference signal sets, wherein the quasi co-location type corresponds to a Doppler shift, a Doppler spread, an average delay, a delay spread, or any combination thereof; and
initiate a beam failure recovery procedure based at least in part on the detected beam failure.

17. The UE of claim 16, wherein the quasi co-location type associated with the plurality of beam failure detection reference signal sets comprises a quasi co-location type corresponding to a spatial filter parameter applicable to a first frequency range and inapplicable to a second frequency range different from the first frequency range.

18. The UE of claim 16, wherein the one or more processors are further operable to execute the code to cause the UE to:
receive, in a message, a transmission configuration indicator state comprising an indication of the quasi co-location type associated with the plurality of beam failure detection reference signal sets.

19. The UE of claim 18, wherein the message comprises a downlink control information message.

20. The UE of claim 18, wherein the message comprises a medium access control-control element message.

21. The UE of claim 18, wherein the reference signal configuration comprises the transmission configuration indicator state.

22. A transmission-reception point for wireless communications, comprising:
one or more memories storing processor-executable code; and
one or more processors coupled with the one or more memories and operable to execute the code to cause the transmission-reception point to:
transmit, to a user equipment (UE), control signaling indicating a reference signal configuration indicating one or more beam failure detection reference signal sets and a quasi co-location type associated with a plurality of beam failure detection reference signal sets including the one or more beam failure detection reference signal sets, wherein at least one beam failure detection reference signal set of the one or more beam failure detection reference signal sets is associated with the transmission-reception point; and
transmit the at least one beam failure detection reference signal set of the one or more beam failure detection reference signal sets using one or more beams according and in accordance with the quasi co-location type associated with the plurality of beam failure detection reference signal sets, wherein the quasi co-location type corresponds to a Doppler shift, a Doppler spread, an average delay, a delay spread, or any combination thereof.

23. The transmission-reception point of claim 22, wherein the quasi co-location type associated with the plurality of beam failure detection reference signal sets comprises a quasi co-location type corresponding to a spatial filter parameter applicable to a first frequency range and inapplicable to a second frequency range different from the first frequency range.

24. The transmission-reception point of claim 22, wherein the one or more processors are further operable to execute the code to cause the transmission-reception point to:
transmit, in a message, a transmission configuration indicator state comprising an indication of the quasi co-location type associated with the plurality of beam failure detection reference signal sets.

25. The transmission-reception point of claim 24, wherein the message comprises a downlink control information message.

26. The transmission-reception point of claim 24, wherein the message comprises a medium access control-control element message.

* * * * *